US005638384A

United States Patent [19]
Hayashi et al.

[11] Patent Number: 5,638,384
[45] Date of Patent: Jun. 10, 1997

[54] DATA COMMUNICATION SYSTEM

[75] Inventors: Katsuhiko Hayashi, Tachikawa; Toru Tateishi, Kokubunji; Katsumi Murano, Tachikawa; Takayasu Aoki, Machida; Hiroaki Sato, Chofu, all of Japan

[73] Assignee: Kabushiki Kaisha Toshiba, Kawasaki, Japan

[21] Appl. No.: 614,261

[22] Filed: Mar. 12, 1996

Related U.S. Application Data

[63] Continuation of Ser. No. 177,608, Jan. 5, 1994, abandoned.

[30] Foreign Application Priority Data

Jan. 7, 1993 [JP] Japan ................................. 5-001262
Jan. 7, 1993 [JP] Japan ................................. 5-001263

[51] Int. Cl.$^6$ .................................................. H03M 13/00
[52] U.S. Cl. ................................. 371/37.1; 371/37.7
[58] Field of Search ............................. 371/37.7, 37.1, 371/38.1, 39.1; 375/58; 358/405, 434, 435, 438, 439

[56] References Cited

U.S. PATENT DOCUMENTS

| | | | |
|---|---|---|---|
| 4,710,925 | 12/1987 | Negi . | |
| 4,829,524 | 5/1989 | Yoshida | 371/32 |
| 4,991,184 | 2/1991 | Hashimoto | 375/58 |
| 5,140,439 | 8/1992 | Tanaka | 358/405 |
| 5,159,465 | 10/1992 | Maemura et al. | 358/405 |

FOREIGN PATENT DOCUMENTS

| | | |
|---|---|---|
| 0 197 545 | 10/1986 | European Pat. Off. . |
| 0 492 812 | 7/1992 | European Pat. Off. . |
| 92-02100 | 2/1992 | WIPO . |

OTHER PUBLICATIONS

Martins, A.C. and Alves, J.C., "ARQ Protocols with Adaptive Block Size Perform Better Over a Wide Range of Bit Error Rates," IEEE Transactions on Communications, vol. 38, No. 6 (Jun. 1990), New York, pp. 737–739.
Shiozaki, A. et al., "A Hybrid ARQ Scheme with Adaptive Forward Error Correction for Satellite Communications," IEEE Transactions on Communications, vol. 39, No. 4 (Apr. 1991), New York, pp. 482–484.
Ishibashi, Y. and Iwabuchi, A., "Throughput Analysis of Adaptive ARQ Schemes", Electronics and Communications in Japan, vol. 72, No. 9 Part I (Sep. 1989), New York, pp. 14–25.

*Primary Examiner*—Paul P. Gordon
*Assistant Examiner*—Thomas E. Brown
*Attorney, Agent, or Firm*—Finnegan, Henderson, Farabow, Garrett & Dunner, L.L.P.

[57] ABSTRACT

In order to combine an ARQ system and an FEC system, an error correction code is inserted between an error detection code for a variable-length ARQ frame and a frame boundary flag pattern. Information to be transmitted is divided into blocks having a suitable length by a block divider in accordance with a line quality judged by a line quality judger, and then subjected to a framing operation by an information frame preparer. The information subjected to the framing operation is attached with a CRC code by a CRC code generation/application circuit, subjected by a zero insertion circuit to an insertion of a suitable number of zero bits therein to provide a distinguished frame boundary with a flag, and the transmitted.

21 Claims, 23 Drawing Sheets

FIG. 9(A)  NORMAL SEQUENCE
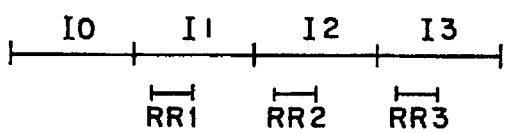
FIG. 9(B)  WHEN AN ERROR TAKES PLACE IN I FRAME
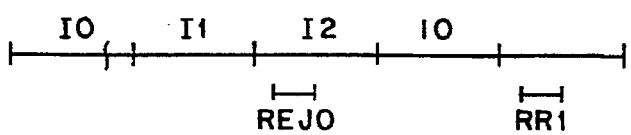
FIG. 9(C)  WHEN AN ERROR TAKES PLACE IN I FRAME AND AN ERROR TAKES PLACE IN REJ FRAME
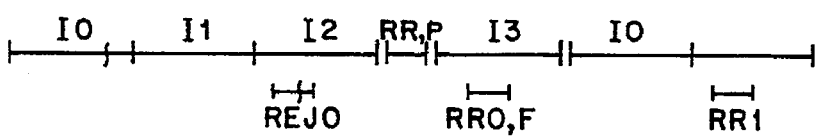

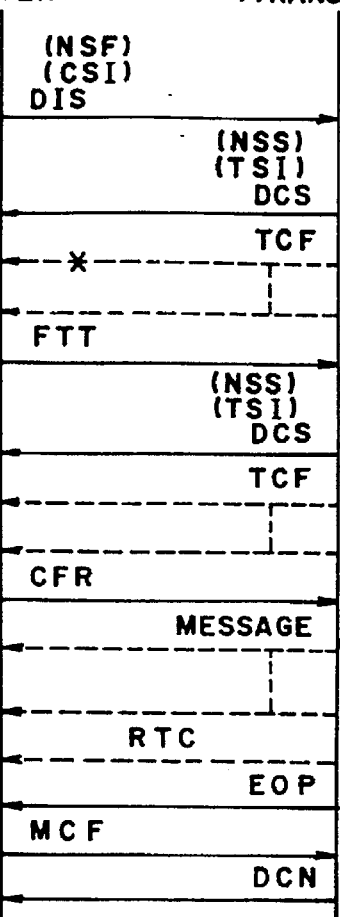
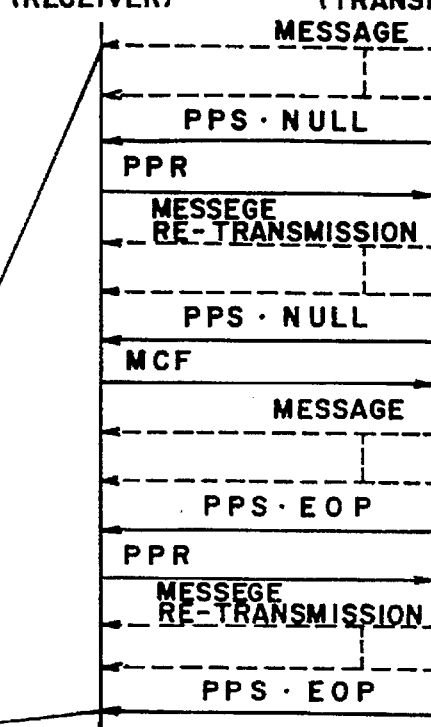
FIG. 10

NORMAL SEQUENCE

WHEN AN ERROR TAKES PLACE IN I FRAME

WHEN AN ERROR TAKES PLACE IN I FRAME AND
AN ERROR TAKES PLACE IN REJ FRAME

DATA COMMUNICATION SYSTEM

This application is a continuation of application Ser. No. 08/177,608 filed Jan. 5, 1994, now abandoned.

BACKGROUND OF THE INVENTION

1. Field of the Invention

The present invention relates to data communication systems which perform transmission and reception of digital data through a duplex communication line and more particularly, to a data communication system which provides an optimum throughput in response to a fluctuation in a line error rate.

2. Description of the Related Art

High level data link control (HDLC) as typical error correction procedures in the data communication system of type referred to. The HDLC procedure, which is a type of error correction procedures called an automatic repeat request (ARQ), is defined in X.25 or the like recommended by the Comite Consultatif International Telegraphique et Telephonique (CCITT)(or The International Telegraph and Telephone Consultative Committee).

FIG. 20 is a diagram for explaining how to convert transmission data in the prior art data communication system based on the HDLC procedure into frames, in which such frames as I, RR and REJ frames are subjected to calculations first on their cyclic redundancy check (CRC) code and are attached at their ends with the calculation results. Next, in order to uniquely define a flag pattern of a frame boundary signal, if the pattern comprises 5 consecutive bits of all "1", then one bit of "0" is inserted at the end of the flag pattern to eliminate such a flag pattern so as to comprise 6 consecutive bits of all "1". Data "01111110" is used as a flag pattern for framing.

The format of each of the frames in the above case is shown in FIG. 21. In the drawing, one frame is made up of an address field, a control field and a data field. The control field further includes a transmission sequence number, a reception sequence number, a P/F bit, and a frame type identifier. And the frame can be identified by its frame type identifier as the I frame, PP frame, REJ frame or the other frame. In this connection, the I frame refers to a frame with the aforementioned information field, the RR frame refers to a frame indicative of a reception acknowledge response, and the REJ frame refers to a frame indicative of a reception rejection response. The I frame has the above transmission sequence number, and each of the I, RR and REJ frames has the reception sequence number as reception response data. The P/F bit is used when failing to receive a response and when checkpointing re-transmission is desired.

FIGS. 22(A) to 22(C) show communication patterns based on the HDLC system.

FIG. 22(A) shows a normal sequence. In the normal sequence, a sender side sequentially transmits the I frames having the transmission sequence numbers 0, 1, 2 . . . , whereas, a receiver side, each time normally receiving the I frame, returns to the sender side the RR frame having the reception sequence number (the transmission sequence number of the I frame to be next expected) attached thereto.

FIG. 22(B) shows a sequence when an error takes place in the I frame, in which case an error occurs in the I frame having the transmission sequence number "0". In this case, the receiver side, when detecting an error through decoding of the CRC code, discards the then frame. And when receiving the I frame having the transmission sequence number "1", the receiver side recognizes the error because the transmission sequence number was skipped, and returns to the sender side the REJ frame having the reception sequence number "0" (the transmission sequence number of the I frame to be expected as again transmitted) attached thereto. The sender side, when receiving the above REJ frame, again transmits the I frame having the above reception sequence number.

FIG. 22(C) shows a sequence when an error takes place in the I frame (FIG. 22(B)) and further an error takes place in the REJ frame. In this case, the sender side discards the REJ frame and transmits the I frames up to a window size (maximum frame number transmittable without response confirmation), because the CRC code of the REJ frame is wrong. Thereafter, the sender side starts a timer and when the timer times out, starts check pointing and the RR frame RR,P having a P bit turned ON. The receiver side, in response to the RR frame RR,P having the P bit turned ON, returns to the sender side the RR frame RR,F having an F bit turned ON. The sender side, on the basis of the reception sequence number of the RR frame RR,F the F bit turned ON, again transmits the I frame in an error re-transmission mode.

The prior art data communication system based on the HDLC procedure of such a structure as mentioned above has had a drawback that, when the system is applied to such a low-quality line that causes an error to take place in a response frame, a throughput is remarkably reduced.

Another one of the error correction systems is known as a forward error correction (FEC) which is applied to one-way transmission line of satellite communication or space communication and in which error correction information is applied to data to correct an error that occurred in the data at its receiver side through its decoding operation. A typical one of the error correction codes is known as BCH code.

Shown in FIG. 23 is how to convert data to be transmitted on a BCH basis into frames. In the illustrated example, the data is divided into blocks of a fixed length and calculated BCH codes are attached to the blocks respectively.

However, when it is desired to employ such a BCH system, the system can be applied merely to data of a predetermined bit length. For example, in the case of the BCH code, the BCH code for 2-bit correction to be applied to data of 239 bits must comprise 16 bits. Therefore, even when the above BCH code is applied to other data having another bit length of more than 239 bits, this causes a correction error and thus the BCH code cannot be applied to such data. This means that data transmission throughput is always reduced by 16 bits per 256 bits, so that, even when the line has a low bit error rate, the throughput cannot be improved. Further, since the error correction code cannot be corrected for an error of bits exceeding a predetermined bit number, it is impossible to realize an error-free system.

In this way, there has been no problem in the above ARQ and FEC procedures so long as both are used in such an environment that demerits in the systems do not appear such as, wired transmission line and satellite communication line, respectively. However, the both procedures are applied to recent duplex transmission line based on radio transmission, the demerits of the procedures appear and thus a satisfactory throughput cannot be obtained. For example, when the prior art procedures are applied to a data communication system using radio transmission line, this causes its throughput to be remarkably reduced, because radio transmission line has generally a high line error and the ordinary HDLC system performs only re-transmission. Meanwhile, the BCH code is suitable for a line having a high error rate, but cannot be applied directly to data transmission because the data transmission usually must be error free. Further, the line error rate varies depending on phasing or shadow wing, but the BCH code cannot undesirably expect a high throughput when the line error rate is low.

For this reason, there is a demand for a data communication system which is fully error free, provides a high throughput when a line error rate is low and provides a throughput higher than that of the usual HDLC procedure-based system when the line error rate is high.

SUMMARY OF THE INVENTION

It is therefore an object of the present invention to provide a data communication system which can secure a high throughput with respect to an identical line error rate of a prior art HDLC system and, even when the line error rate is fluctuated, can provide an optimum throughput at the fluctuated error rate.

Another object of the present invention is to provide a data communication system which can meet a time requirement prescribed in a CCITT recommendation regardless of a data delay on a transmission line between a data transmission device and a terminal.

In accordance with an aspect of the present invention, the above objects can be attained by providing a data communication system for transmitting/receiving digital information via a duplex communication line, which system comprises a block divider for dividing information to be transmitted into information blocks each having a suitable length, and a framing part for converting the information blocks divided by the block divider into frames and for transmitting the frames; and wherein the framing part further includes an error detection code generation/application part for generating an error detection code for each of the information blocks divided by the block divider and for attaching the error detection code to the associated information block, error correction code generation/application part for generating an error correction code for the information block having the error detection code attached by the error detection code generation/application part and for attaching the error correction code to the associated information block, and a zero insertion part for inserting a time fill signal in the absence of transmission of the frame and for inserting a suitable number of zero bits in the information block having the error correction code attached by the error correction code generation/application part to provide a distinguished boundary between the time fill signal and the frame.

In accordance with another aspect of the present invention, there is provided a data communication system for transmitting/receiving digital information via a duplex communication line, which system comprises a block divider for dividing information to be transmitted into information blocks each having a suitable length, a framing part for converting the information blocks divided by the block divider into frames and for transmitting the frames, and a line quality judger for judging on the basis of a bit error state of the communication line whether a line quality is good or bad; and wherein the block divider changes the length of the information to be divided according to the good or bad line quality judged by the line quality judger.

In accordance with a further aspect of the present invention, there is provided a data communication system for transmitting/receiving digital information via a duplex communication line, which system comprises a block divider for dividing information to be transmitted into information blocks each having a suitable length, a framing part for converting the information blocks divided by the block divider into frames and for transmitting the frames, and a line quality judger for judging on the basis of a bit error state of the communication line whether a line quality is good or bad; and wherein the framing part includes an error detection code generation/application part for generating an error detection code for each of the information blocks to be transmitted and for attaching the error detection code to the associated information block, an error correction code generation/application part for generating an error correction code for the information block having the error detection code attached by the error detection code generation/application part and for attaching the error correction code to the associated information block, and a zero insertion part for inserting a time fill signal in the absence of transmission of the frame and for inserting a suitable number of zero bits in the information block having the error correction code attached by the error correction code generation/application part to provide a distinguished boundary between the time fill signal and the frame, and further wherein the block division part, when the line quality judger judges that the line quality is good, divides the information into information blocks having a length exceeding an error correctable upper limit code length based on the error correction code.

In the present invention, information to be transmitted is divided by the block divider and then passed to the framing part. The framing part outputs the received information to the error detection code generation/application part which in turn generates the error detection code for the information divided by the block divider and attaches the error detection code to the information. The information is further sent to the error correction code generation/application part which in turn generates the error correction code for the information having the error detection code attached by the error detection code generation/application part and attaches the error correction code to the information. The information is further passed to the zero insertion part which in turn inserts the time fill signal in the absence of frame transmission and also inserts a suitable number of zero bits to the information having the error correction code attached by the error correction code generation/application part to provide a distinguished boundary between the time fill signal and the frame.

That is, in order to combine the ARQ system and the FEC system, the error correction code is inserted between the error detection code of the variable-length ARQ frame and the frame boundary flag pattern.

Further, the information to be transmitted is divided by the block divider and then passed to the framing part. When the line quality judger judges that the line quality is good, the block divider divides the information into frames having a length exceeding the error correctable upper limit code length; whereas, when the line quality judger judges that the line quality is bade, the block divider divides the information into frames having a length below the error correctable upper limit code length.

As a result, when the line error rate is low, the frame length can be made long and the throughput can be increased even by invalidating the error correction code.

In a range exceeding the error correctable upper limit code length or in a range below the error correctable upper limit code length, the block divider makes longer the frame length at the time of a certain line quality than the frame length at the time of a worse line quality through the further detailed judgement of the line quality judger.

As a result, when the line error rate is bad, the block division can be carried out with a short frame length; whereas, when the line error rate is good, the block division can be carried out with a long frame, whereby an optimum throughput can be obtained at the respective error rates.

Further, the error correction code is separated from the received frame having the error correction code attached thereto, decoded by the error corrector to detect an error generated in the information, and then the error is corrected. The line quality judger judges whether the line quality is good or bad on the basis of the error detected by the error corrector.

Further, there are provided an error corrector for separating the error correction code from the received frame having the error correction code attached thereto, decoding the error correction code to detect an error generated in the information, and correcting the error; and an error detector for separating the error detection code from the frame after subjected to the correction by the error corrector, and decoding the error detection code to detect an error not corrected by the error corrector, wherein the line quality judger judges whether the line quality is good or bad on the basis of the error detected by the error detector.

Furthermore, the line quality judger includes a time fill error detector for receiving a time fill signal in the absence of frame reception and detecting an error generated in the time fill signal, and the line quality judger judges whether the line quality is good or bad on the basis of the error detected by the time fill error detector. In this case, the line error rate can be measured even in the absence of frame reception.

The line quality judger includes a re-transmission request frame receiver for receiving a re-transmission request response frame from an information frame receiver side, and the line quality judger judges whether the line quality is good or bad on the basis of the error of the information frame that caused the re-transmission request response frame received by the re-transmission request frame receiver. In this case, the user can know the generation of the error which could not corrected by the error correction code and detected by the error detection code in the information frame receiver side and can measure the line error rate.

In the information frame receiver side, the line quality judger for judging the good or bad line quality on the basis of the bit error state of the communication line returns the measured line quality information to the information frame transmitter side as a line quality information frame. The information frame transmitter side receives the line quality information frame and judges whether the line quality is good or bad on the basis of the received frame. In this case, the information frame transmitter side can know the line quality measured at the information frame receiver side at the side of the information frame transmitter, and its own line quality can be judged.

Further, there is provided an error corrector for separating the error correction code from the received frame having the error correction code attached thereto and decoding the error correction code to correct an error generated in the information. The error corrector is operated only when the value of a frame length counter for counting the bit length of the received frame having the error correction code attached thereto is below the correctable upper limit code length, and the error corrector fails to correct the error when the value of the counter exceeds the correctable upper limit code length. In this case, in order that the information frame transmitter side can have an optimum throughput, even if the bit number of the frame length is made to exceed the correctable upper limit code length, it is possible not to generate any correction error.

The response inducement frame preparer prepares a response inducement frame when the response frame predictor predicts a response frame during the transmission of next one or plural information frames from the information frame preparer without waiting for a response to the previously-transmitted frame. In this case, even if an error occurs in the response frame of the ARQ system, checkpointing can be started through the detection of the error, whereby it can be avoided that generation of an error in the response frame causes reduction of the throughput.

In this way, in accordance with the present invention, the combination of the ARQ and FEC systems enables the realization of an error-free system which could not be attained with the use of the FEC system alone and also enables the improvement of a throughput at a high error rate which could not be attained with use of the ARQ system alone. Further, since a line error rate is measured in an environment where the line error rate fluctuates, data can be transmitted with a suitable frame length for the optimum throughput at the measured line error rate. Thus, a high throughput can be obtained at a low error rate and a fairly-high throughput can be obtained at a high error rate. Further, an extreme reduction in the throughput caused by a high error rate can be also avoided.

In accordance with yet a further aspect of the present invention, further, there is provided a data communication system which comprises a data transmission device connected to a public switching telephone network and a facsimile communication machine connected to the data transmission device through a predetermined transmission line for transmitting facsimile document to a group 3 party facsimile terminal connected to the public switching telephone network through the predetermined transmission line and the data transmission device; and wherein the data transmission device includes a transmission rate determination part, prior to transmission of the facsimile document from the facsimile terminal, for transmitting a training check signal to the party facsimile terminal on the public switching telephone network and when receiving a response to the training check signal from the party facsimile terminal, for determining a transmission rate of the facsimile document, and a notification part for informing the facsimile communication machine of the transmission rate determined by the transmission rate determination part.

That is, the transmission rate determination part of the data transmission device, prior to transmission of the facsimile document of the terminal, transmits the training check signal to the group 3 facsimile machine and, when receiving the response to the training check signal from the party facsimile machine, determines the transmission rate of the facsimile document, and the notification part informs the terminal of the determined transmission rate.

In this case, since the transmission rate determination part of the data transmission device transmits the training signal and receives the response signal to the transmitted training signal from the party facsimile machine to thereby determine the transmission rate of the message data, even when a data delay takes place on the transmission line, the time requirement prescribed by the CCITT can be satisfied and the necessary filler amount can be obtained on the side of the terminal on the basis of the transmission rate determined at the side of the data transmission device.

In the present invention, in addition to the above arrangement, the data transmission device includes a code detection part for detecting a code signal indicative of return to a post message procedure to the party facsimile terminal from a message procedure causing the facsimile document from the party facsimile terminal to be transmitted to the facsimile communication machine, and a post message procedure part for shifting to the post message procedure when the code detection part detects the code signal.

That is, the code detection part of the data transmission device detects the code signal indicative of return to a post message procedure to the party facsimile terminal from the message procedure causing the facsimile document from the party facsimile terminal to be transmitted to the facsimile communication machine, and the post message procedure part of the data transmission device shifts to the post message procedure when the code detection part detects the code signal.

In this connection, since shift to the post message procedure is done in response to the detection of the code signal at the data transmission device side, the time requirement prescribed by the CCITT can be satisfied even in the presence of a data delay on the transmission line.

In the present invention, further, in addition to the above arrangement, the data transmission device further includes a first error correction control part for performing error correction control of the group 3 facsimile machine over data transmission with the party facsimile machine and a second error correction control part for performing error correction control over data transmission with the terminal.

That is, the first error correction control part performs error correction control of the group 3 facsimile machine over data transmission with the party facsimile machine and the second error correction control part performs error correction control over data transmission with the terminal.

In this case, since error correction control over the data transmission with the party facsimile machine is carried out by the first error correction control part of the data transmission device side, even when a data delay takes place on the transmission line due to the error correction control over the data transmission with the terminal, the time requirement prescribed by the CCITT can be satisfied.

In this way, in accordance with the present invention, regardless of a data delay on the transmission line between the data transmission device, transmission of facsimile document to the group 3 facsimile machine connected to the public switching telephone network can be realized while the time requirement prescribed in the CCITT recommendation is satisfied. As a result, the communication time can be prevented from being prolonged and thus increase in the communication charge can be prevented.

BRIEF DESCRIPTION OF THE DRAWINGS

FIGS. 9(A) to 9(C) show exemplary communication patterns of the embodiment of FIG. 1;

Figure 11:
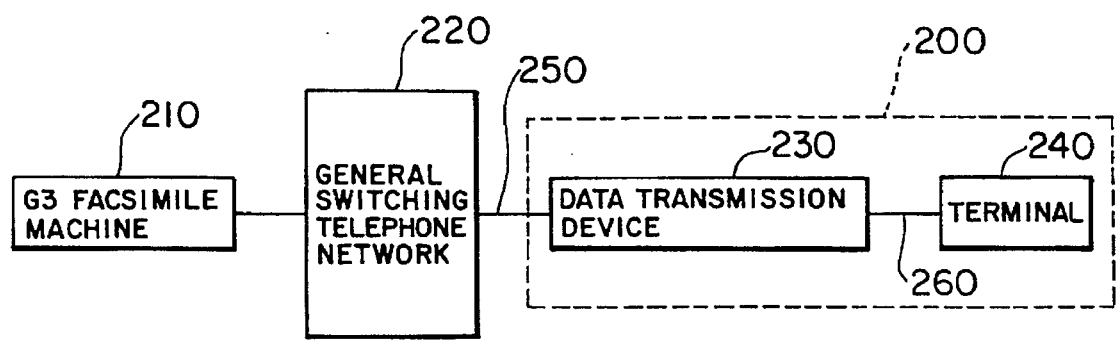
Figure 12:
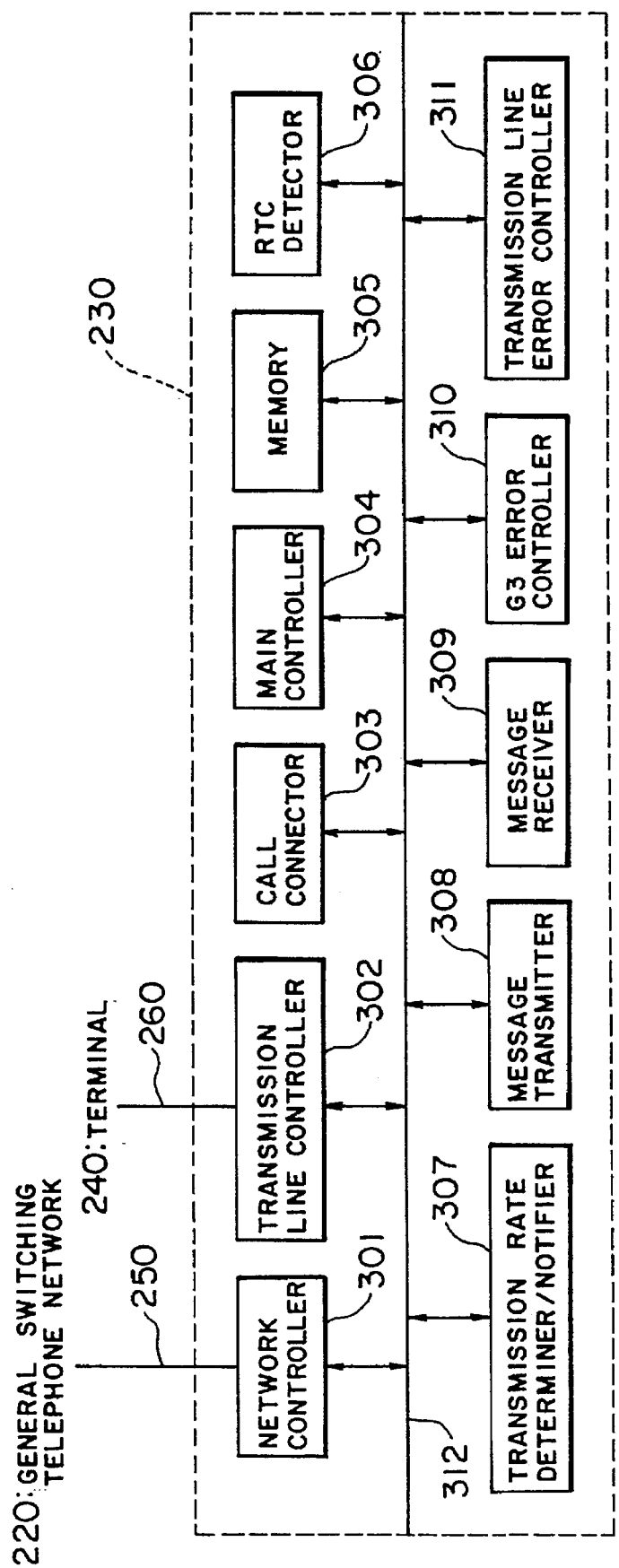
Figure 13:
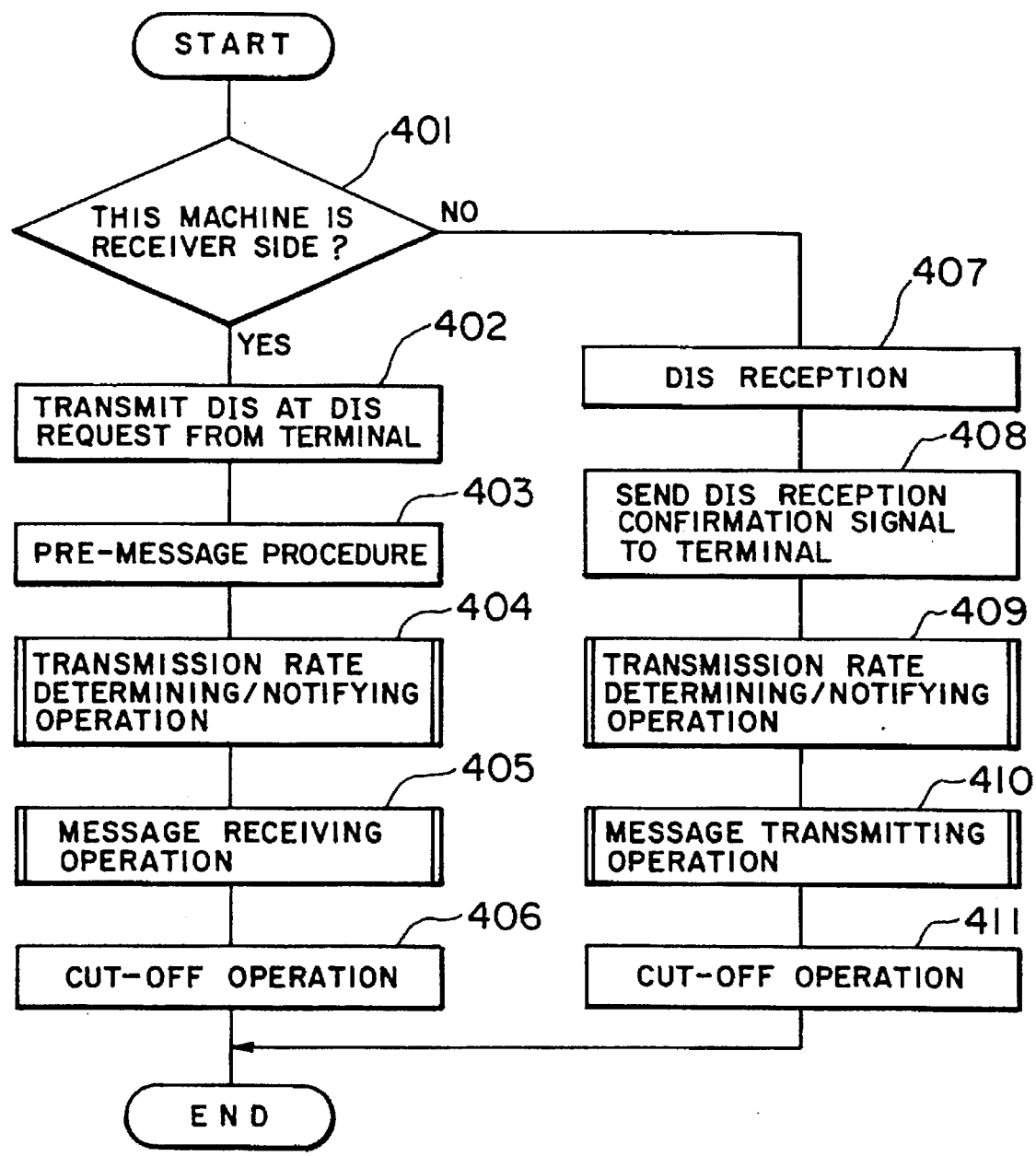
Figure 14:
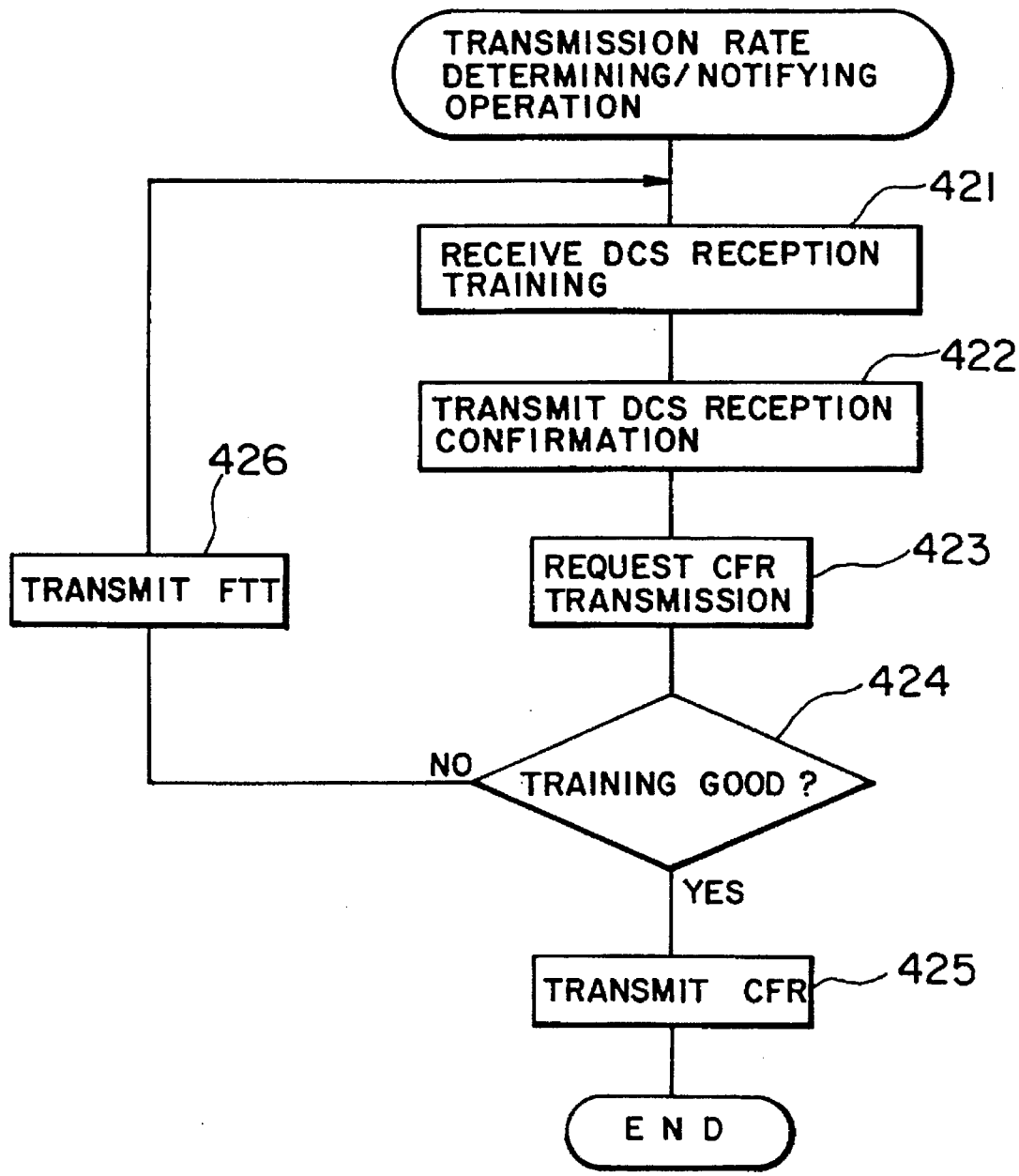
Figure 15:
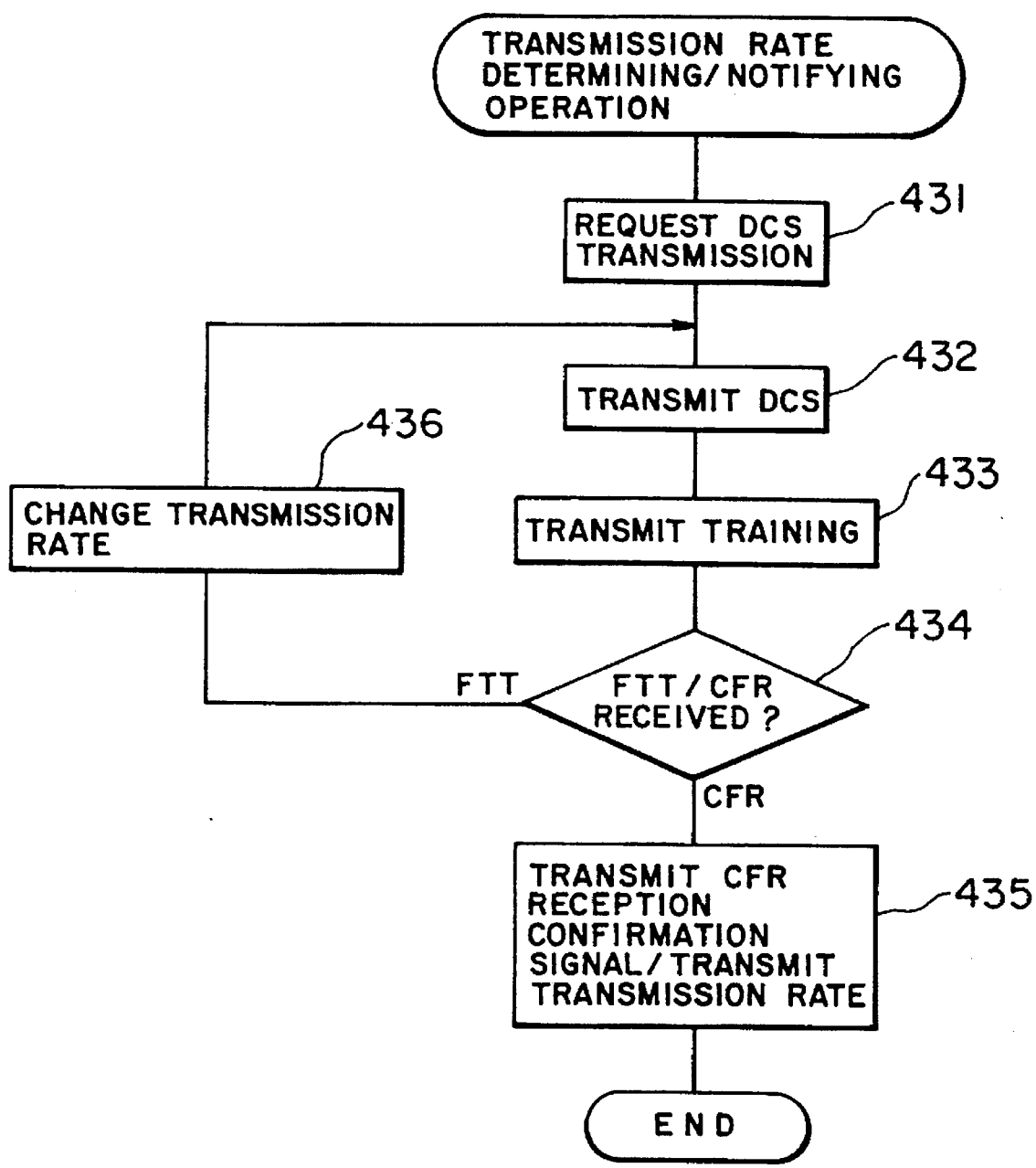
Figure 16:
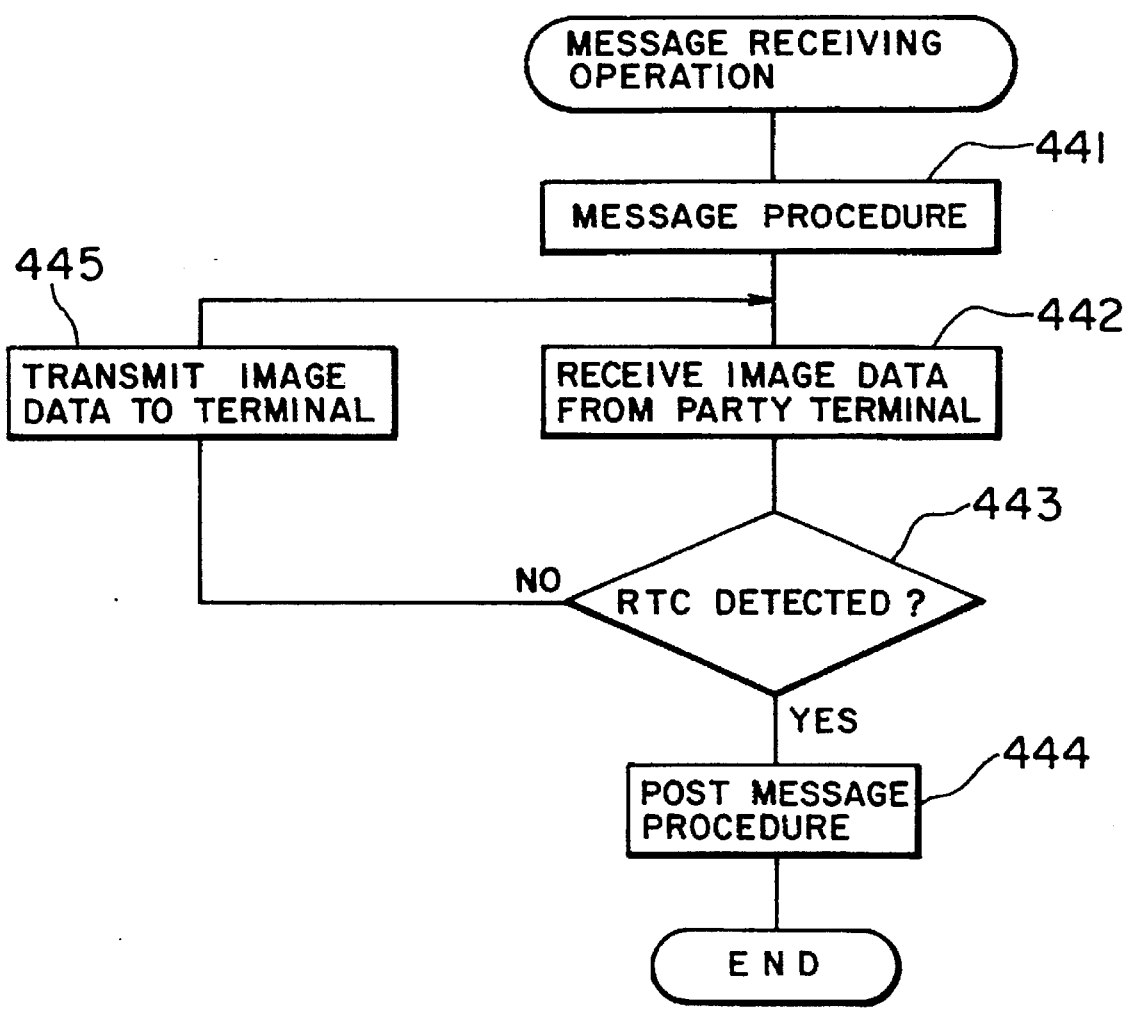
Figure 17:
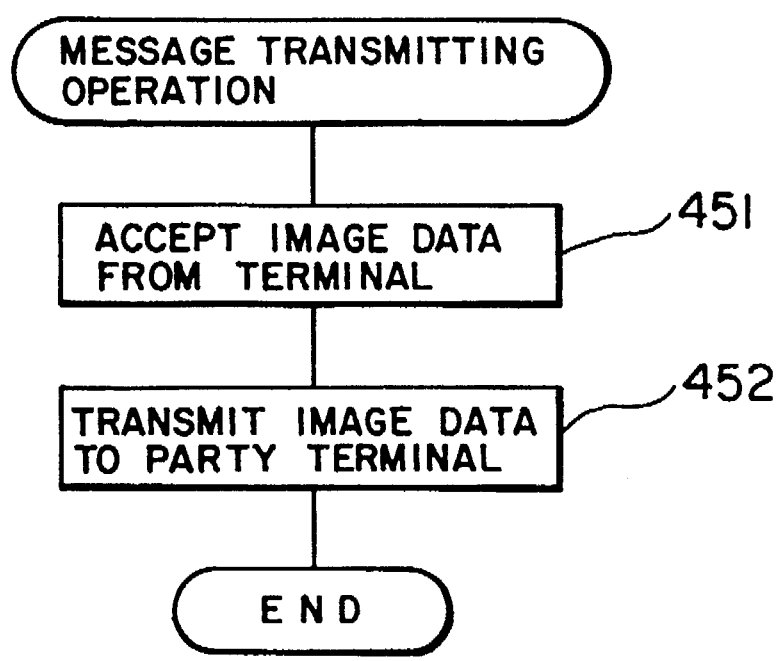
Figure 18:
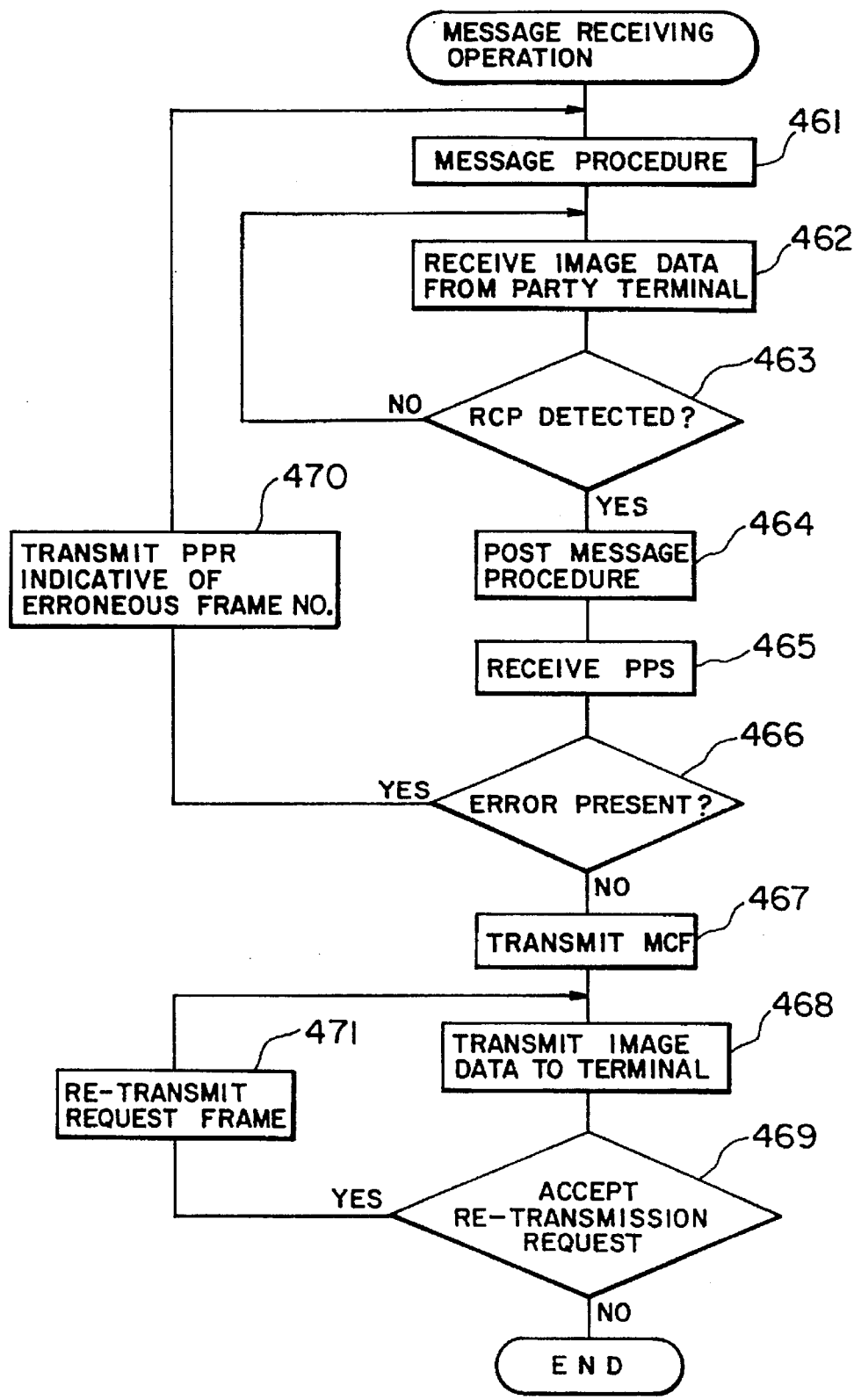
Figure 19:
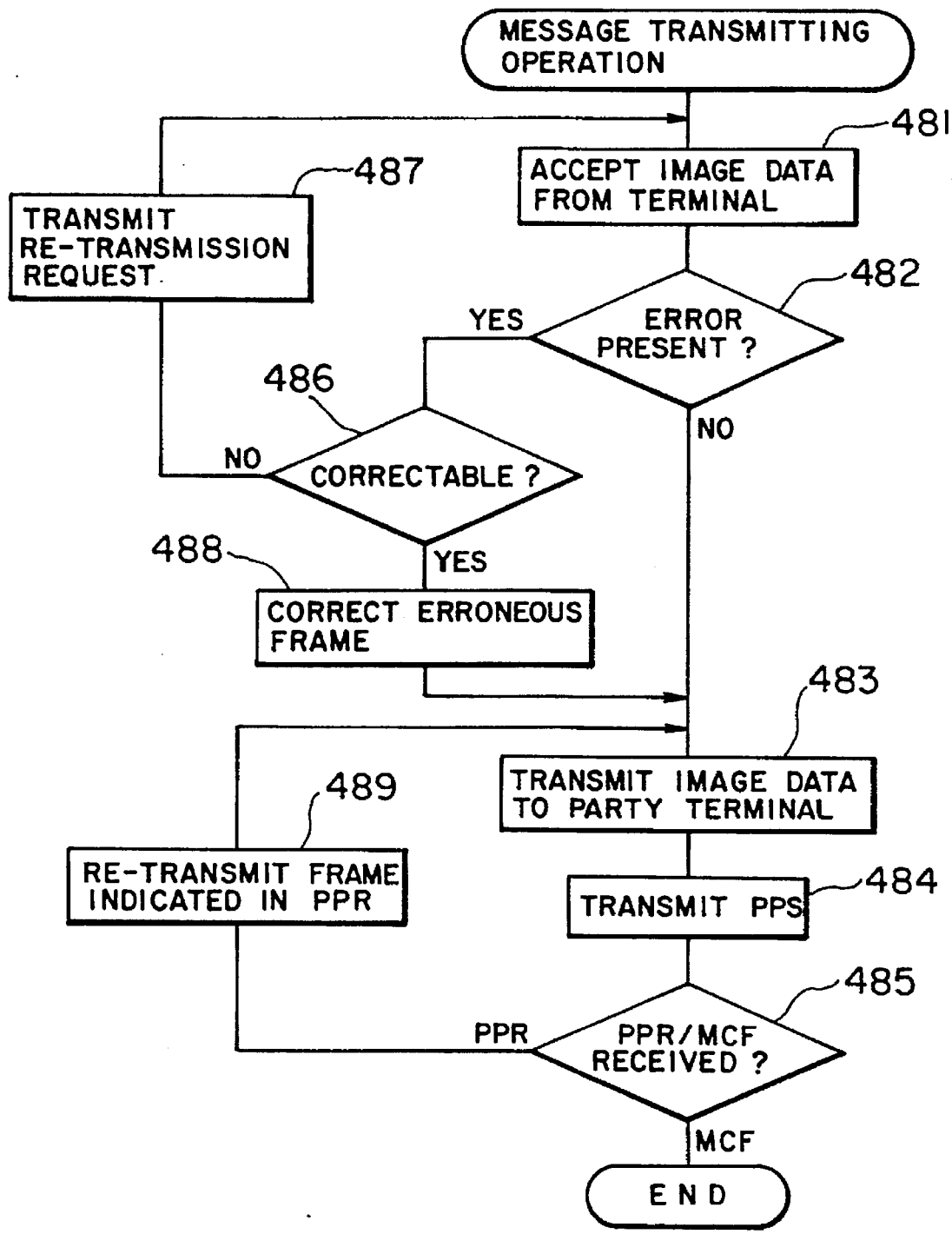
Figure 20:
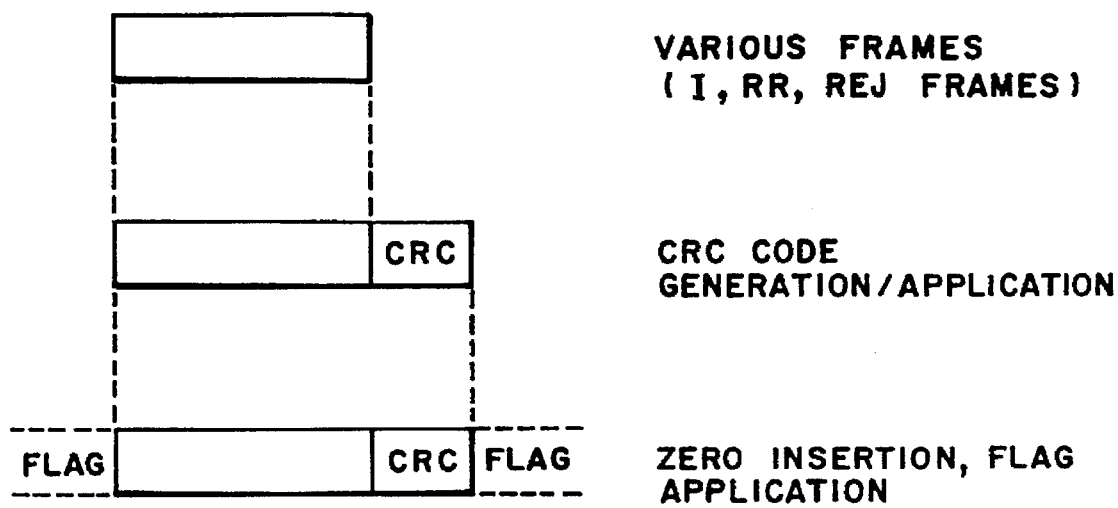
Figure 21:
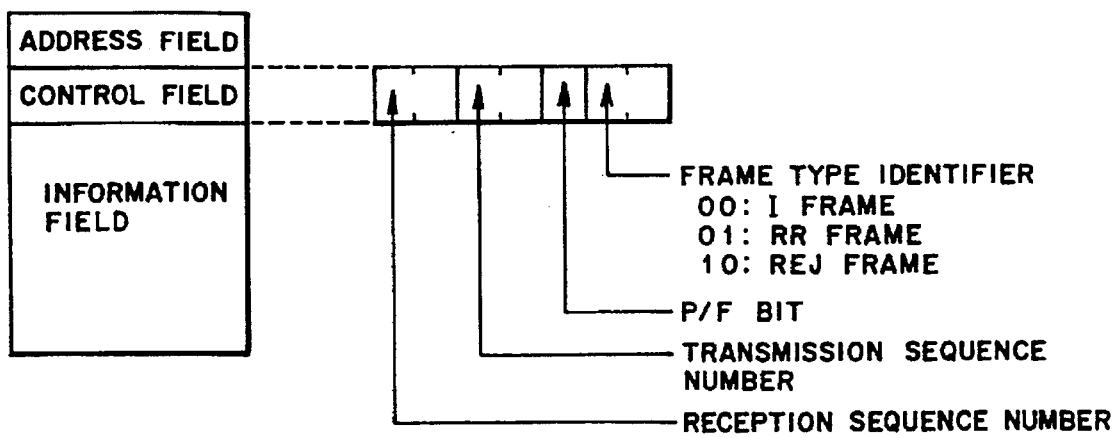
Figure 22A:
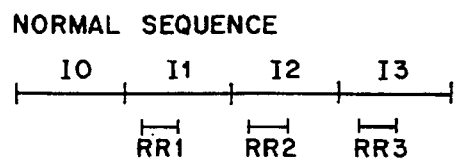
Figure 22B:
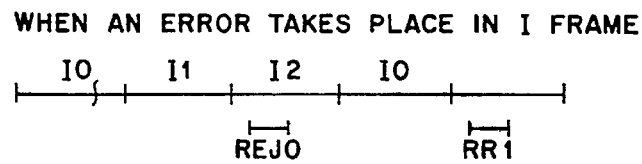
Figure 22C:
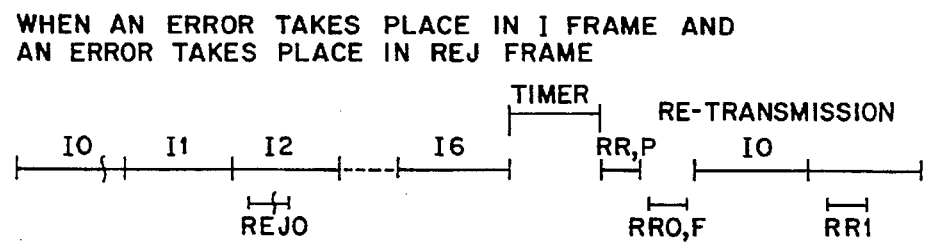
Figure 23:
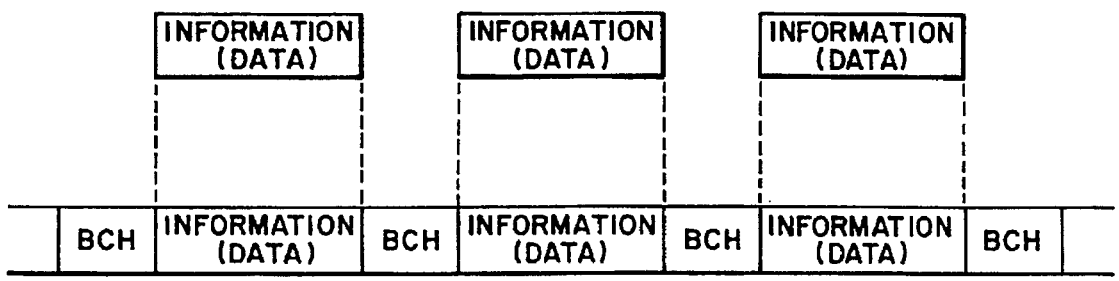

Parts (a) and (b) of FIG. 10 are sequential charts showing a G3 facsimile procedure;

FIG. 11 is a block diagram of an entire arrangement of a facsimile communication system which includes the data communication system of the present invention;

FIG. 12 is a block diagram of a detailed structure of a data transmission device in FIG. 11;

FIG. 13 is a flowchart showing the entire operation of the data transmission device of FIG. 12 in its communication mode;

FIG. 14 is a flowchart showing the details of transmission rate determining/notifying operation in FIG. 13;

FIG. 15 is a flowchart showing the details of other transmission rate determining/notifying operation in FIG. 13;

FIG. 16 is a flowchart showing an example of message receiving operation in FIG. 13;

FIG. 17 is a flowchart showing an example of message transmitting operation in FIG. 13;

FIG. 18 is a flowchart showing an example of other message receiving operation in FIG. 13;

FIG. 19 is a flowchart showing an example of other message transmitting operation in FIG. 13;

FIG. 20 shows how to convert transmission data into frames in a prior art data communication system employing an HDLC procedure;

FIG. 21 shows exemplary structures of conventional I, RR and REJ frames respectively;

FIGS. 22(A) to 22(C) show communication patterns in the prior art HDLC system; and FIG. 23 shows how to convert data into frames in the prior art BCH system.

DESCRIPTION OF THE PREFERRED EMBODIMENTS

A data communication system in accordance with an embodiment of the present invention will be detailed with reference to the accompanying drawings.

Figure 1:
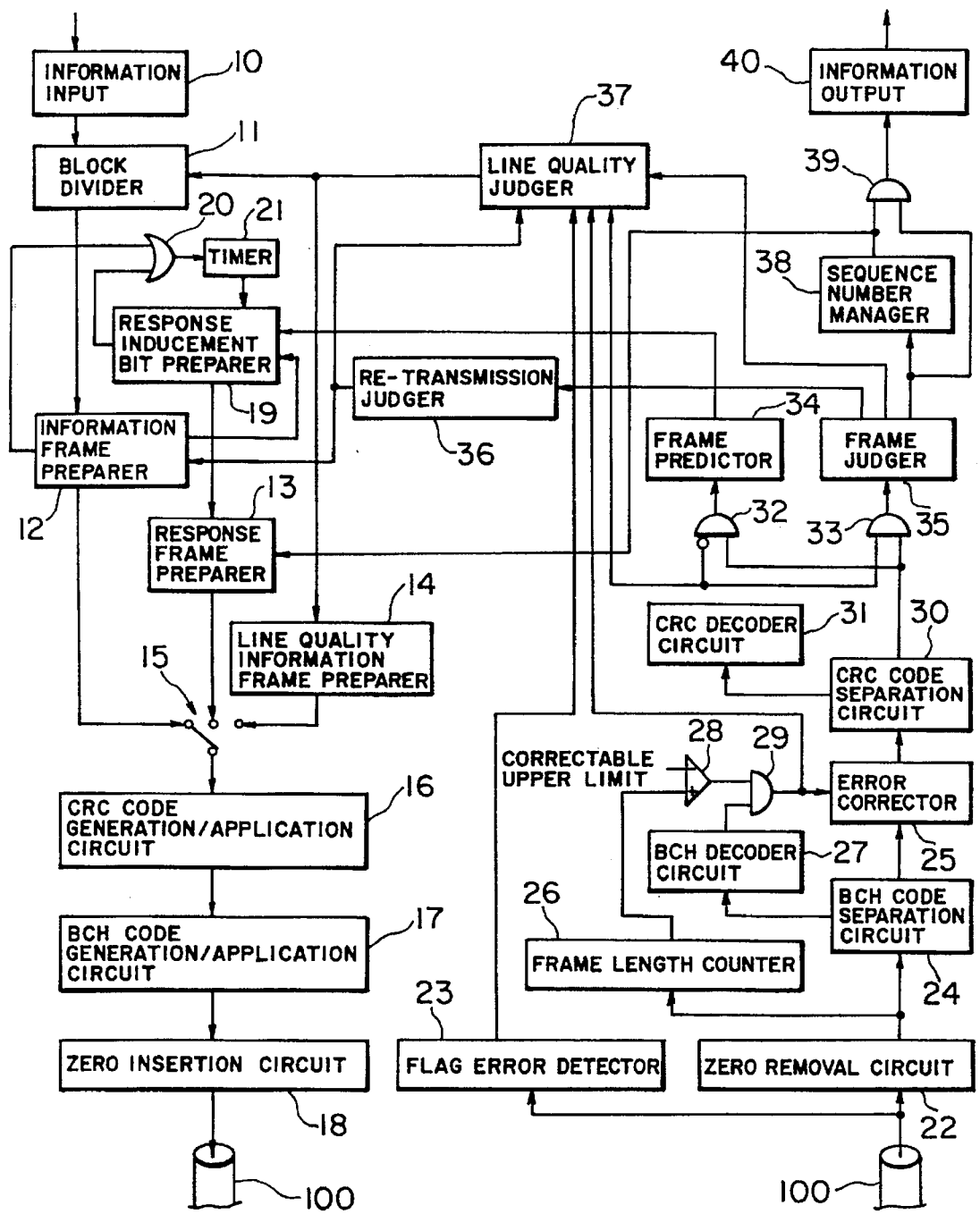
FIG. 1 is a block diagram of a data communication system in accordance with an embodiment of the present invention.

Referring first to FIG. 1, there is shown a block diagram of a data communication system in accordance with an embodiment of the present invention. The data communication system of the present embodiment receives transmission information (to be transmitted) from an information input circuit 10, applies necessary information to the received transmission information, and outputs the applied information onto a duplex communication line 100; whereas, the data communication system receives information from the duplex communication line 100, removes a predetermined applied information from the received information, and outputs it from an information output circuit 40.

In this case, data communication devices (not shown) are connected to the information input and output circuits 10 and 40 respectively, so that transmission information (to be transmitted) generated from one data communication device is applied to the information input circuit 10, while information issued from the information output circuit 40 is applied to the other data communication device. For the data communication devices, various types of data communication devices can be considered and any types of data communication devices be employed so long as they can transmit and receive digital information.

Further, though the duplex communication line 100 is depicted as a wired communication line in FIG. 1, the line 100 is not limited to the specific example but may be a radio type line. In other words, when such a line as to have a considerably high and varying line error rate is employed for the duplex communication line 100, the effects of the present embodiment become especially great.

In FIG. 1, more in detail, transmission information (to be transmitted) received from an external device (not shown) is applied to the information input circuit 10. The information input circuit 10, which forms an interface with the external device, applies the received transmission information to a block divider 11. The block divider 11 divides the transmission information received from the information input circuit 10 into information blocks each having a suitable length. The information dividing operation of the block divider 11 is controlled according to the line quality (good or bad) of a line (i.e., communication line 100) judged by a line quality judger 37 (which will be detailed later).

That is, in the present embodiment, information transmission control to the communication line 100 is carried out on an information block basis of the information blocks divided by the block divider 11. Since the length of information providing an optimum throughput varies depending on line error rate, the block divider 11 divides the received information into blocks of a predetermined length so as to provide an optimum throughput.

Figure 2:
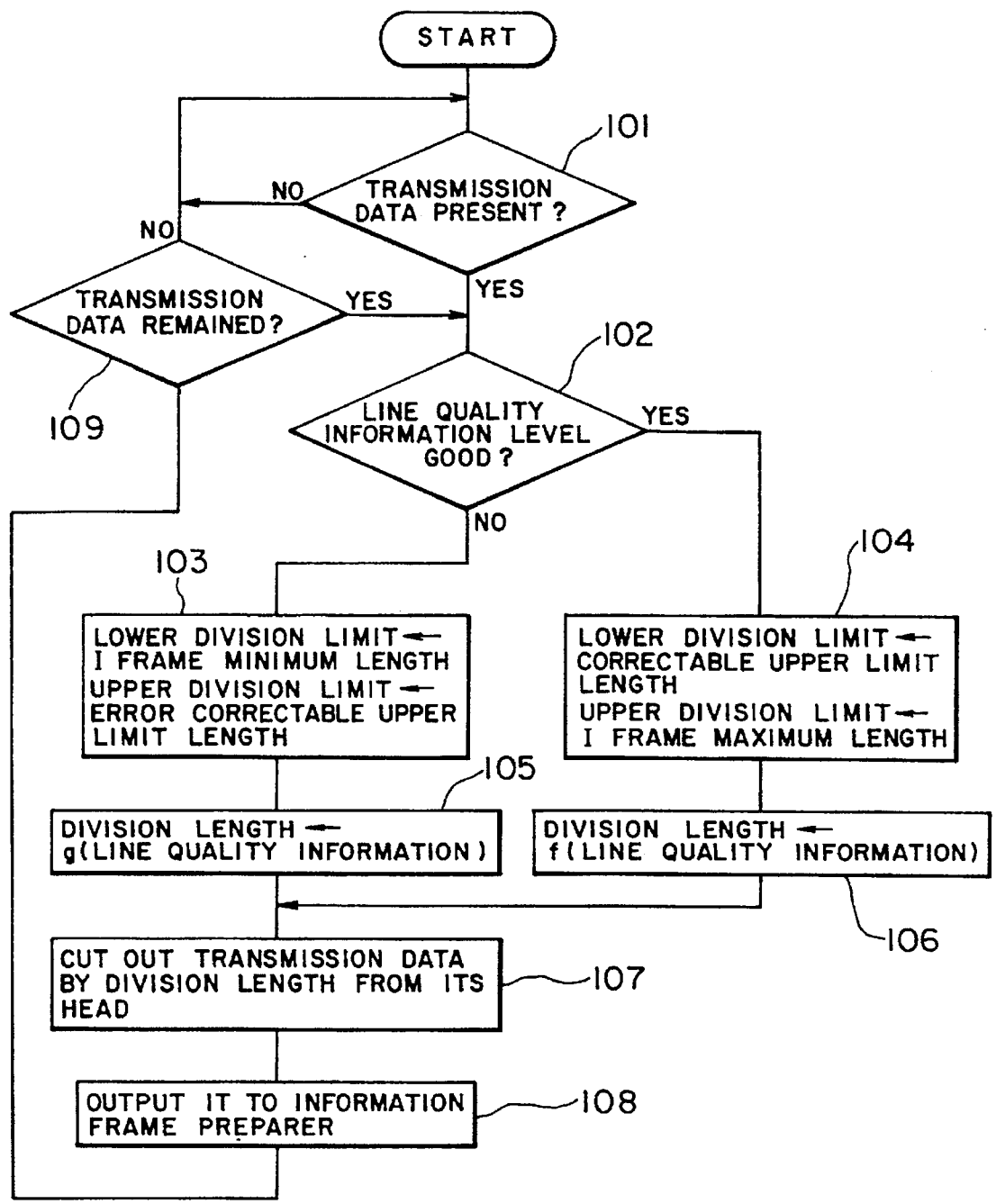
FIG. 2 is a flowchart showing an example of the dividing operation of a block divider in FIG. 1.

An example of the information dividing operation of the block divider 11 is shown by a flowchart in FIG. 2.

In the present embodiment, each of the information blocks divided by the block divider is applied with a CRC code as an error detection code and a BCH code as an error correction code.

In this connection, the optimum frame length to the line quality when the error correction based on the BCH code is carried out, is different from that when the error correction is not carried out.

Figure 3:
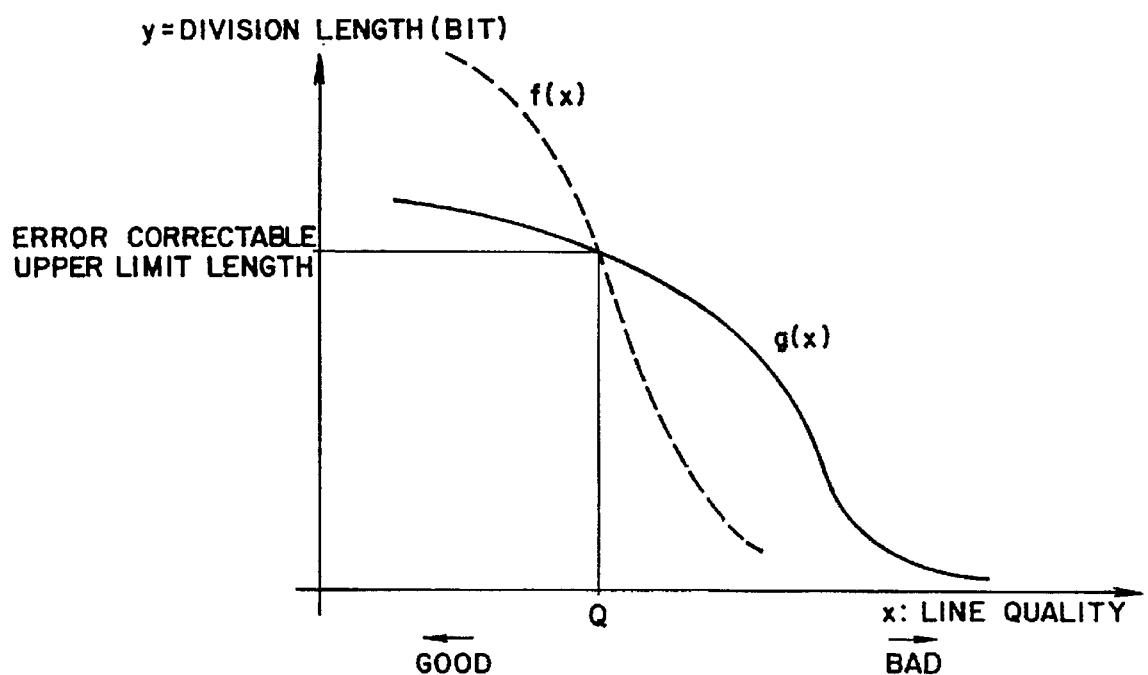
FIG. 3 is a graph showing an optimum frame length characteristic function g(x) with respect to line quality when error correction based on BCH code is carried out as well as an optimum frame length characteristic function f(x) with respect to the line quality when the error correction based on the BCH code is not carried out.

The above difference is shown in FIG. 3. In the drawing, a function g(x) shows an optimum frame length characteristic to the line quality when the error correction based on the BCH code is carried out, while a function f(x) shows an optimum frame length characteristic to the line quality when the BCH code error correction is not carried out, where quantity x in the function denotes the line quality.

More specifically, the optimum frame length characteristic function g(x) based on the error correction of the BCH code intersects the optimum frame length characteristic function f(x) based on the absence of the error correction of the BCH code at a point indicative of an error correctable upper limit length in the error correction of the BCH code. Accordingly, when the line quality is worse than a line quality Q corresponding to the error correctable upper limit length of the BCH code, it is preferable to carry out the BCH code error correction because the optimum frame length can be made long; while, when the line quality is better than the line quality Q corresponding to the error correctable upper limit length of the BCH code, it is desirable not to carry out the BCH code error correction because the optimum frame length can be made long.

For this reason, in the present embodiment, a range of division frame length by the block divider 11 is set to be between the minimum length of I frame and the error correctable upper limit length when the line quality is worse than the line quality Q; while, the range is set to be between the error correctable upper limit length and the maximum length of the I frame when the line quality is better than the line quality Q.

In the flowchart of FIG. 2, the block divider 11 first examines whether or not information (to be transmitted) is received from the information input circuit 10, that is, transmission data is present (step 101). In the absence of the transmission data, the block divider 11 returns directly to the step 101 to wait for an input of the transmission data from the information input circuit 10. In the presence of the transmission data, the block divider 11 examines a line quality information level received from the line quality judger 37 (step 102).

When the block divider knows on the basis of the received line quality information level that the line quality is bad, that is, the line quality shown in FIG. 3 is worse than the line quality Q, the block divider sets the division lower limit of the block division therein at the I frame minimum length and also sets the division upper limit of the block division at the error correctable upper limit length (step 103). In this case, the optimum division length is determined in accordance with the optimum frame length characteristic function g(x) of FIG. 3 to the line quality (step 105).

When determining in the step 102 on the basis of the received line quality information level that the line quality is good, i.e., the line quality shown in FIG. 3 is better than the line quality Q, the block divider 11 sets the division lower limit of the block divider at the error correctable upper limit length and also sets the block division upper limit at the I frame maximum length (step 104). In this case, the optimum division length is determined in accordance with the optimum frame length characteristic function f(x) to the line quality in FIG. 3 (step 106).

The block divider 11, after determining the block division length thereof in this way, next cuts out the transmission data by an amount corresponding to the division length from its head (step 107) and outputs it to an information frame preparer 12 (step 108).

The block divider 11 then examines the presence or absence of the still remaining transmission data (step 109). Determination of the presence of the remaining transmission data causes the block divider to shift to the step 102 to repeat the aforementioned block dividing operation.

When determining in the step 109 that the remaining divided information block is absent, the block divider returns to the step 101 to wait for an input of the next transmission data.

The information frame preparer 12, on the basis of the division data accepted from the block divider 11, prepares an I frame. An example of the information frame preparing operation of the information frame preparer 12 is shown by a flowchart in FIG. 4.

Figure 4:
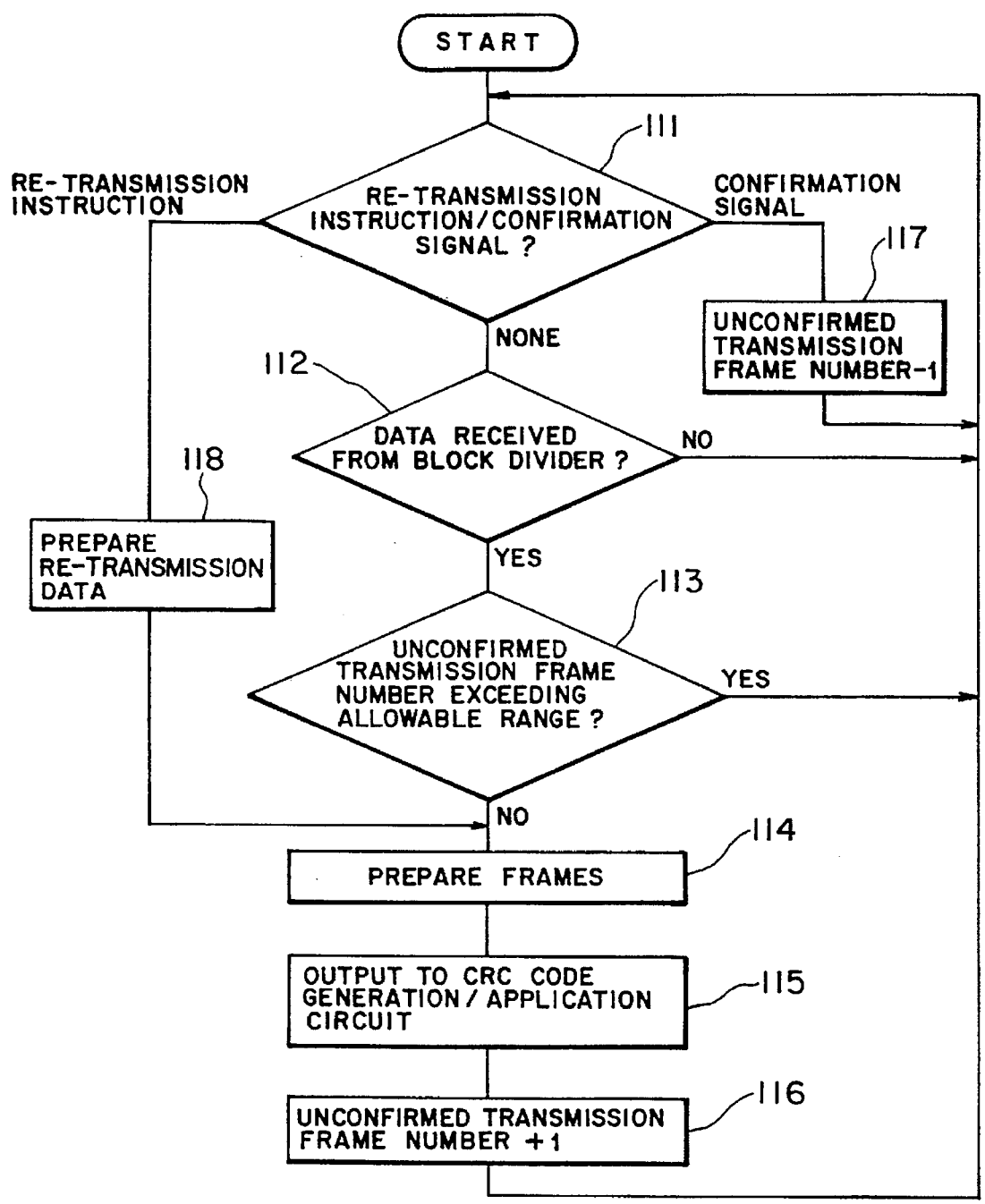
FIG. 4 is a flowchart showing an example of the information frame preparing operation of an information frame preparer in FIG. 1.

In FIG. 4, the information frame preparer 12 first examines the presence or absence of a re-transmission instruction and a confirmation signal (step 111). The re-transmission instruction and confirmation signal are sent from a re-transmission judger 36 (which will be detailed later).

The information frame preparer 12, when determining in the step 111 the absence of both of the re-transmission instruction and confirmation signal, next examines the presence or absence of the data received from the block divider 11 (step 112). In the absence of the data, the information frame preparer 12 waits for an input of data from the block divider 11.

Determination of the presence of the data received from the block divider 11 in the step 112 causes the information frame preparer 12 to examine an unconfirmed transmission frame number (step 113).

The present embodiment is arranged to transmit the next I frame prior to reception of a response to the previously transmitted I frame from the party side. The number of frames whose transmission from the party side is not confirmed by the response from the party side is referred to as "unconfirmed transmission frame number". The maximum of the unconfirmed transmission frame number is set to be, for example, "7" so that, when the unconfirmed transmission frame number reaches "7", the information frame preparer 12 temporarily stops its information frame preparing operation.

Accordingly, when the information frame preparer 12 judges in the step 113 that the unconfirmed transmission frame number exceeded its maximum value, the information frame preparer 12 returns to the step 111 to wait until the unconfirmed transmission frame number falls into its allowable range.

When determining in the step 113 that the unconfirmed transmission frame number is within the allowable range, the information frame preparer 12 executes its frame preparing operation (step 114) and outputs the prepared frame to a CRC code generation/application circuit 16 through a change-over switch 15 (step 115). And the information frame preparer 12 adds the unconfirmed transmission frame number by "1" and returns to the step 111.

When determining in the step 111 to be the confirmation signal, the information frame preparer 12 subtracts "1" from the unconfirmed transmission frame number (step 117) and returns to the step 111.

When determining in the step 111 to be re-transmission instruction, the information frame preparer 12 makes preparation for the re-transmission data associated with the re-transmission instruction (step 118). When getting ready for the re-transmission data, the information frame preparer 12 executes frame preparing operation of the re-transmission data (step 114), and outputs the prepared frame through the change-over switch 15 to the CRC code generation/ application circuit 16 (step 115). And the information frame preparer 12 adds "1" to the unconfirmed transmission frame number and returns to the step 111.

A response frame preparer 13, which prepares an RR or REJ frame as a response frame. The response frame preparing operation of the response frame preparer 13 is carried out on the basis of a sequence number coincidence/non-coincidence signal received from a sequence number manager 38 (which will be explained later).

Figure 5:
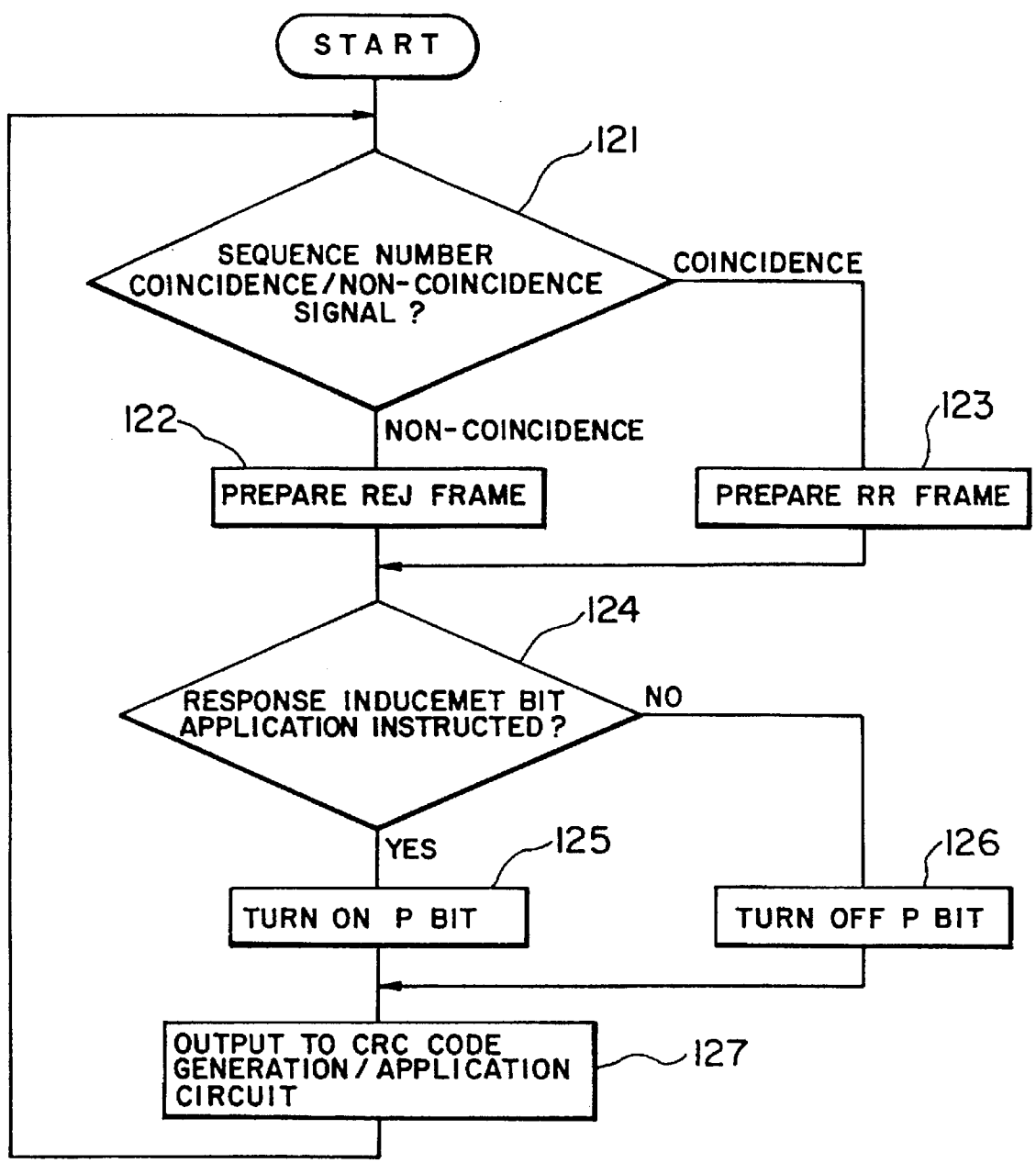
FIG. 5 is a flowchart showing an example of the response frame preparing operation of a response frame preparer in FIG. 1.

An example of the response frame preparing operation of the response frame preparer 13 is shown by a flowchart in FIG. 5.

In FIG. 5, the response frame preparer 13 examines the presence or absence of the sequence number coincidence/ non-coincidence signal received from the sequence number manager 38 (step 121). When finding the sequence number non-coincidence signal, the response frame preparer 13 prepares the REJ frame (step 122), whereas, when finding the sequence number coincidence signal, the response frame preparer 13 prepares the RR frame (step 123).

Next, the response frame preparer 13 examines the presence or absence of the response inducement bit application instruction (step 124). In the illustrated example, the response inducement bit application instruction is prepared in a response inducement bit preparer 19. The details of the operation of the response inducement bit preparer 19 will be described by referring to FIG. 6.

When determining in the step 124 of FIG. 5 the presence of the response inducement bit application instruction, the response frame preparer 13 turns on a P bit (which will be explained later) (step 125); whereas, when determining the absence of the response inducement bit application instruction, the response frame preparer 13 turns off the P bit (step 126).

The RR or REJ frame thus prepared is sent from the response frame preparer 13 through the change-over switch 15 to the CRC code generation/application circuit 16 (step 127).

The response inducement bit preparer 19, when a frame predictor 34 predicts the RR or REJ frame or when a predetermined time elapses without any prediction of the RR or REJ frame, generates the response inducement bit application instruction and applies the response inducement bit application instruction to the response frame preparer 13.

Figure 6:
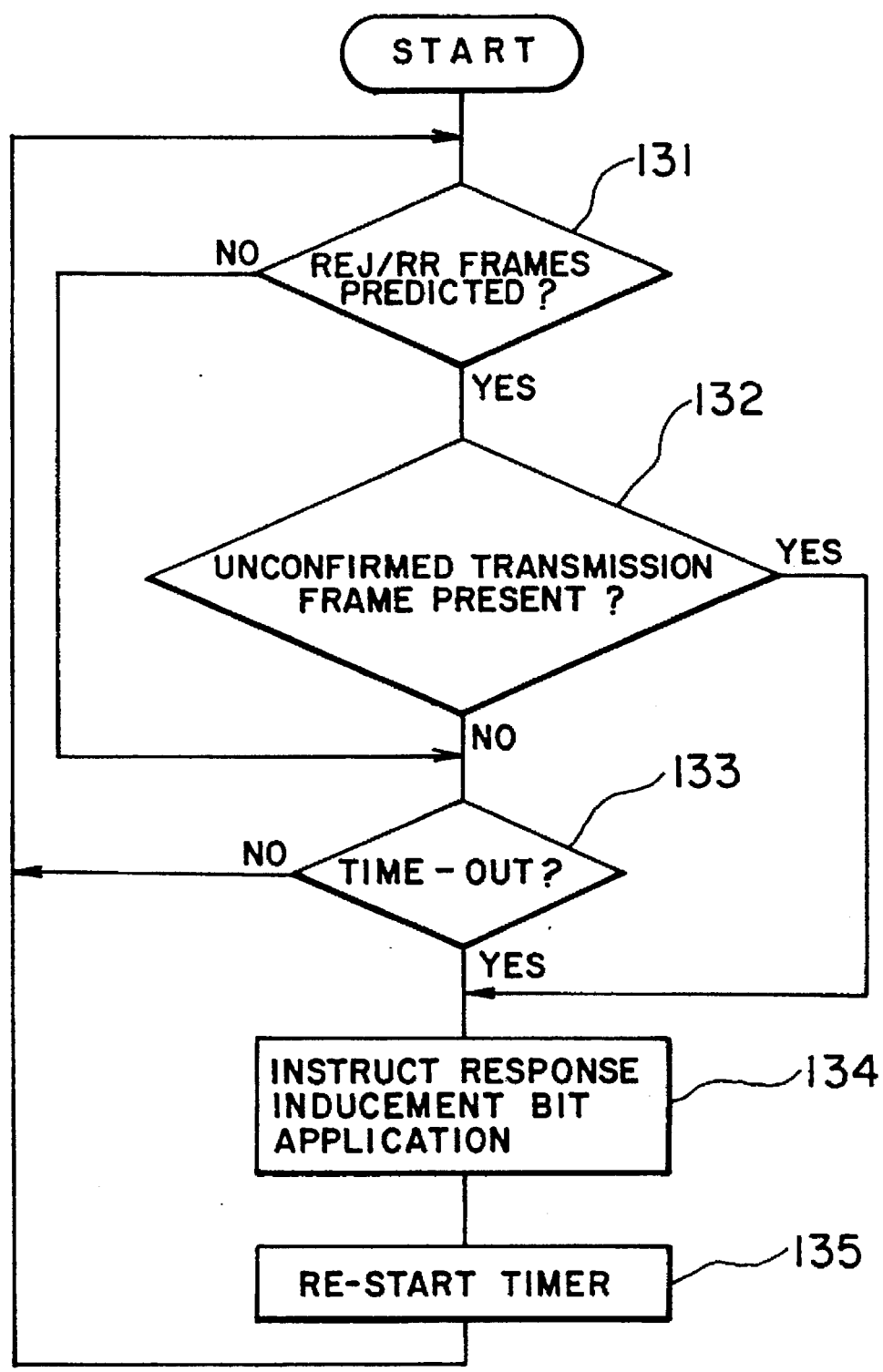
FIG. 6 is a flowchart showing an example of the response inducement bit preparing operation of a response inducement bit preparer in FIG. 1.

An example of the operation of the response inducement bit preparer 19 is shown by a flowchart in FIG. 6.

In FIG. 6, the response inducement bit preparer 19 examines whether or not the frame predictor 34 predicted the RR or REJ frame (step 131). When determining that the frame predictor 34 predicted the RR or REJ frame, the response inducement bit preparer 19 then examines the presence or absence of an unconfirmed transmission frame (step 132). The determination of the presence of the unconfirmed transmission frame causes the response inducement bit preparer 19 to immediately generate the response inducement bit application instruction and applies it to the response frame preparer 13 (step 134). And the response inducement bit preparer 19 sends a timer restart signal through an OR circuit 20 to a timer 21 to restart the timer 21 (step 135). The timer 21 also receives the timer restart signal from the information frame preparer 12 through the OR circuit 20, such that the timer 21 be restarted each time the information frame preparer 12 finishes the I frame preparing operation.

When determining in the step 131 the predicted RR or REJ frame or when determining in the step 132 the absence of the unconfirmed transmission frame, the response inducement bit preparer 19 next examines whether or not the timer 21 timed out (step 133). When determining the time-out of the timer 21, the response inducement bit preparer 19 generates the response inducement bit application instruction and applies it to the response frame preparer 13 (step 134), after which the response inducement bit preparer 19 sends the timer restart signal to the timer 21 via the OR circuit 20 to restart the timer 21 (step 135).

A line quality information frame preparer 14 prepares a line quality information frame on the basis of the line quality information or bit error rate judged by the line quality judger 37 and outputs it to the CRC code generation/application circuit 16 through the change-over switch 15.

Figure 7:
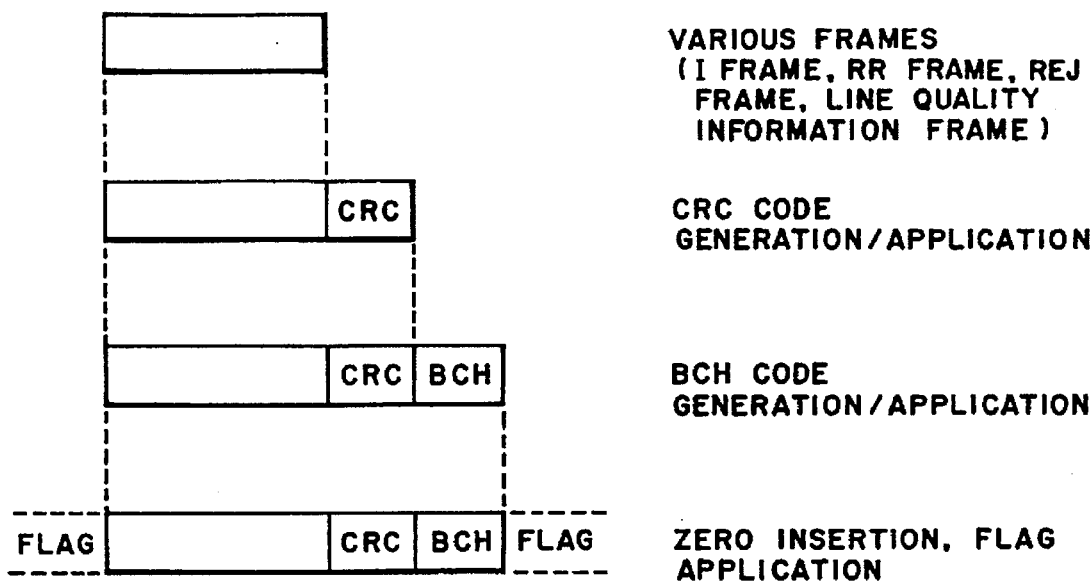
FIG. 7 shows exemplary structures of I, RR, REJ and line quality information frames respectively.

FIG. 7 shows exemplary structures of the I frame prepared by the information frame preparer 12, the RR and REJ frames prepared by the response frame preparer 13, and the line quality information frame prepared by the line quality information frame preparer 14.

The I frame prepared by the information frame preparer 12, the RR and REJ frames prepared by the response frame preparer 13, and the line quality information frame prepared by the line quality information frame preparer 14 are each basically made up of an address field, a control field and an information field. The control field includes a transmission sequence number, a reception sequence number, a P/F bit and a frame type identifier. These I, RR, REJ and line quality information frames are identified by their frame type identifiers. In the present embodiment, the frame type identifiers "00", "01", "10" and "11" are allocated to the I, RR, REJ and line quality information frames, respectively.

In this case, the I and line quality information frames each include the information field. More specifically, the information field of the I frame contains user information as the transmission data received from the information input circuit 10, and the information field of the line quality information frame contains a bit error rate indicative of a line quality. The I frame is prepared by the information frame preparer 12, while the line quality information frame is prepared by the line quality information frame preparer 14.

Meanwhile, the RR frame as a reception acknowledge response and the REJ frame as a reception rejection response each include no information field. The RR and REJ frames are prepared by the response frame preparer 13.

The I frame has the transmission sequence number, while the I, RR and REJ frames each have the reception sequence number as reception response information. The P/F bit is used to perform the checkpointing re-transmission when no response is received or when frame prediction is carried out in the frame predictor 34. In more detail, the P bit, as shown in the flowchart of FIG. 5, is turned on or off according to the response inducement bit application instruction received from the response inducement bit preparer 19.

The I frame prepared by the information frame preparer 12, the RR and REJ frames prepared by the response frame preparer 13, and the line quality information frame prepared by the line quality information frame preparer 14, each having such a frame structure as explained in FIG. 7, are subjected predetermined framing operations at the CRC code generation/application circuit 16, a BCH code generation/application circuit 17 and a zero insertion circuit 18.

Figure 8:
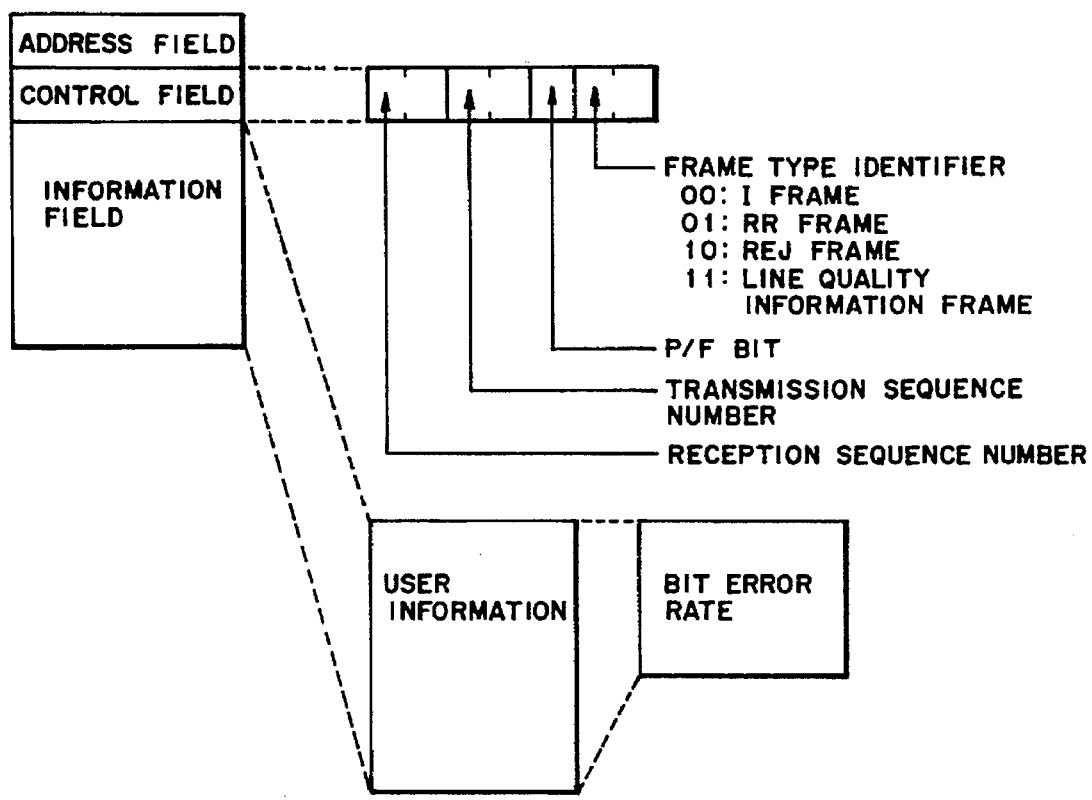
FIG. 8 shows how a CRC code generation/application circuit, a BCH code generation/application circuit and a zero insertion circuit in FIG. 1 convert transmission data into frames.

Shown in FIG. 8 is how to convert transmission data into frames at the CRC code generation/application circuit 16, BCH code generation/application circuit 17 and zero insertion circuit 18.

The I frame prepared by the information frame preparer 12, the RR and REJ frames prepared by the response frame preparer 13, or the line quality information frame prepared by the line quality information frame preparer 14, is first applied to the CRC code generation/application circuit 16 where a cyclic redundancy check (CRC) code is calculated and its calculation result is applied or attached to the last part of each frame.

Next, the frame having the CRC code attached thereto is applied to the BCH code generation/application circuit 17 where a BCH code is calculated and its calculation result is attached to the last part of the frame.

The frame having the BCH code having the BCH code attached thereto is applied to the zero insertion circuit 18 where, in order to make unique the flag pattern as its frame boundary signal, if the frame has consecutive 5 bits of all "1" data, one bit of "0" is inserted at the last part of the 5 bits to avoid the use of consecutive 6 bits of all "1" data. And "01111110" is used as the flag pattern for the framing.

The data thus subjected to the framing is output onto the communication line 100.

Meanwhile, data subjected at the party side to such framing and received from the duplex communication line 100 is first applied to a zero removal circuit 22.

The zero removal circuit 22 removes "0" located behind consecutive 5 bits of all "1" data within the frame. If the data has consecutive 6 bits of all "1", then the zero removal circuit 22 recognizes it as a flag, i.e., a frame boundary.

The frame data with the "0" behind the consecutive 5 bits of all "1" removed or recognized as the frame boundary by the zero removal circuit 22 is applied to a BCH code separation circuit 24 and also to a frame length counter 26.

The BCH code separation circuit 24 separates the BCH code from the rear end of the frame, and applies it to a BCH decoder circuit 27. The BCH code separation circuit 24 also applies the remaining data to an error corrector 25.

The frame length counter 26 counts the number of consecutive bits in the data other than the flag to find the frame length of the received frame.

The BCH decoder circuit 27 extracts correction information from the separated BCH code and applies the extracted correction information to an AND circuit 29.

The frame length counted by the frame length counter 26 is applied to a comparator 28 where the frame length is compared with a preset correctable upper limit value. The comparator 28 outputs a signal of "1" when the frame length counted by the frame length counter 26 does not exceed the correctable upper limit and a signal of "0" when the counted frame length exceeds the correctable upper limit. The signal is applied to the AND circuit 29 as a gating signal.

The AND circuit 29 is opened when the frame length counted by the frame length counter 26 does not exceed the correctable upper limit, so that the AND circuit 29 applies the correction information received from the BCH decoder circuit 27 to the error corrector 25; whereas, the AND circuit 29 is closed when the frame length output of the BCH decoder circuit 27 exceeds the correctable upper limit, so that the AND circuit 29 fails to apply the correction information output of the BCH decoder circuit 27 to the error corrector 25.

As a result, so long as the frame length counted by the frame length counter 26 is smaller than the correctable upper limit, the error corrector 25 performs its error correcting operation based on the correction information received from the BCH decoder circuit 27.

The frame data subjected at the error corrector 25 to the error correction is applied to a CRC separation circuit 30.

The CRC separation circuit 30 separates the CRC code from the rear end of the error-corrected frame, and applies it to a CRC decoder circuit 31 and also applies the remaining data to AND circuits 32 and 33.

The CRC decoder circuit 31 performs its error detecting operation based on the separated CRC code. The error detection of the CRC decoder circuit 31 is carried out to detect an error which failed to be corrected at the error corrector 25. The CRC decoder circuit 31 outputs a signal of "1" when detecting an error through the error detection and a signal of "0" when failing to detect an error. The output of the CRC decoder circuit 31 is applied directly to the AND circuit 33, and also applied but as inverted to the AND circuit 32 respectively as gating signals of the AND circuits 32 and 33.

Accordingly, when the CRC decoder circuit 31 fails to detect an error, the CRC-code-separated frame data as the output of the CRC separation circuit 30 is applied from the AND circuit 33 to a frame judger 35; whereas, when the circuit 31 detects an error, the frame data is applied from the AND circuit 32 to the frame predictor 34.

The frame judger 35, on the basis of the frame type identifier of the received frame data, judges whether the received frame is the I, RR, REJ or line quality information frame.

When judging that the received frame is the I frame, the frame judger 35 outputs the received frame to the sequence number manager 38 and also to an AND circuit 39. When judging that the received frame is the RR or REJ frame, the frame judger 35 outputs the frame to the re-transmission jJudger 36. When judging that the frame is the line quality information frame, the frame judger 35 outputs the frame to the line quality judger 37.

The sequence number manager 38 extracts the transmission sequence number from the received frame and judges whether or not the transmission sequence number is the expected one. Generation of a CRC error causes the transmission sequence number of the received frame not to coincide with the expected one. In this case, the sequence number manager 38 outputs a sequence number coincidence/noncoincidence signal of "0". When no generation of a CRC error causes the transmission sequence number of the received frame to coincide with the expected one, the sequence number manager 38 outputs a sequence number coincidence/noncoincidence signal of "1".

The sequence number coincidence/noncoincidence signal issued from the sequence number manager 38 is applied to the response frame preparer 13 (which is already explained above) and also to the AND circuit 39 as a gating signal.

Thus, when the sequence number manager 38 judges a coincidence between the transmission sequence number of the received frame and its expected one, the AND circuit 39 is opened so that the I frame output of the frame judger 35 is applied to the information output circuit 40.

The information output circuit 40, which forms an interface with an external device (not shown), outputs to the external device as output information the I frame that is issued from the frame judger 35 and received through the AND circuit 39.

The re-transmission judger 36 receives the RR or REJ frame from the frame judger 35. The re-transmission judger 36 recognizes the frame as the re-transmission instruction when receiving the REJ frame from the re-transmission judger 36 and as the confirmation signal when receiving the RR frame, and outputs the re-transmission instruction/confirmation signal to the information frame preparer 12 (already explained above) and also to the line quality judger 37.

The frame predictor 34 receives the output of the CRC separation circuit 30 when the CRC decoder circuit 31 detects an error and examines the length of the received frame. And when the received frame length is, e.g., 2 bytes, the frame predictor 34 predicts the reception of the RR or REJ frame.

The output of the frame predictor 34 is applied to the response inducement bit preparer 19 (already explained above).

A flag error detector 23 monitors the flag pattern transmitted from the duplex transmission line 100 and detects an error in the flag pattern. An output of the flag error detector 23 is applied to the line quality judger 37.

The line quality judger 37 receives the line quality information frame output of the frame judger 35, the output of the CRC decoder circuit 31, the output of the AND circuit 29, the output of the flag error detector 23 and the output of the re-transmission judger 36; detects an error state in the reception communication line on the basis of the outputs of the CRC decoder circuit 31, AND circuit 29 and flag error detector 23; detects an error state in the transmission communication line on the basis of the line quality information frame output of the frame judger 35 and the output of the re-transmission judger 36; recognizes a general line quality based on the detected error states; and outputs line quality information based on the recognition. The line quality information issued from the line quality judger 37 is applied to the block divider 11 and line quality information frame preparer 14 (both are already explained above).

FIGS. 9(A) to ((C) show examples of the communication pattern of the present embodiment when arranged in such a manner as mentioned above.

More detail, FIG. 9(A) shows a normal sequence, FIG. 9(B) shows a sequence when an error takes place in an I frame, and FIG. 9(C) shows a sequence when an error takes place in a REJ frame in addition to the case of FIG. 9(B).

In the normal sequence of FIG. 9(A), a sender side sequentially prepares the I frames at the information frame preparer 12 and sequentially transmits the I frames in the order of their transmission sequence numbers of "0", "1", "2", . . . , whereas, a receiver side, each time the sequence number manager 38 detects the normal reception of the I frame, attaches a reception sequence number (transmission sequence number of the I frame to be next expected) to a RR frame at the response frame preparer 13, and returns the reception-sequence-number-attached RR frame to the sender side.

The sequence of FIG. 9(B) shows when an error takes place in the I frame having the transmission sequence number "0". In this case, when the receiver side detects the error through the decoding of the CRC code by the CRC decoder circuit 31, the receiver side discards the frame. And when the receiver side receives the I frame having the next transmission sequence number "1", the receiver side recognizes the error at the sequence number manager 38 because of the skipped transmission sequence number, attaches a reception sequence number "0" (transmission sequence number of the I frame to be expected to be again transmitted) to a REJ frame at the response frame preparer 13, and returns the REJ frame to the sender side. The sender side, when receiving the REJ frame, determines the re-transmission at the re-transmission judger 36 and again transmits from the information frame preparer 12 to the receiver side the I frame having the then reception sequence number.

The sequence of FIG. 9(C) shows when an error takes place in a REJ frame in addition to the case of FIG. 9(B). In this case, since the CRC code of the REJ frame is wrong, the sender side discards the frame. However, the reception of the REJ frame having a wrong CRC code is predicted by the frame predictor 34, so that an response inducement bit application instruction is immediately applied to the response frame preparer 13 from the response inducement bit preparer 19, whereby a RR frame RR.P having a turned-on P bit is transmitted from the response frame preparer 13. The receiver side, in response to the RR frame RR.P having the turned-on P bit, turns on an F bit, attaches the turned-on F bit to a RR frame having a reception sequence number to form a RR frame RR.F, and returns the RR frame RR.F to the sender side. The sender side, on the basis of the reception sequence number of the received RR frame RR.F having the turned-on F bit, again transmits the I frame for error re-transmission.

With such an arrangement, even when the system of the present invention is applied to such a low-quality line as to cause an error in a response frame, it can be avoided that the throughput of the system is remarkably reduced.

Next, explanation will be directed to another embodiment wherein the present invention is applied to a facsimile communication system having a data transmission device connected to a general switching telephone network and a terminal connected to the data transmission device through a predetermined transmission line.

In the present embodiment, in spite of a data delay on the predetermined transmission line between the data transmission device and terminal, there can be realized facsimile document transmission which satisfies the time of a group 3 facsimile procedure prescribed in the CCITT recommendation.

Meanwhile, the sequence of the general group 3 facsimile procedure (which will be referred to merely as the G3 facsimile procedure, hereinafter) is prescribed in the CCITT recommendation.

The G3 facsimile procedure is shown in FIG. 10, wherein Part (a) shows a sequence when an error correction system is not employed, and Part (b) shows a sequence when the error correction system is employed.

In the sequence (a) of FIG. 10 based not on the error correction system, a called station, in response to a calling tone CNG from a calling station (not shown), first transmits a digital identification signal DIS to inform the calling station of the ability of the called station. In some applications, the called station may transmit a non-standard function identification signal NSF or a called-terminal identification signal CIS.

In response to it, the caller station wants to be used as a transmitter, transmits a digital command signal DCS. The digital command signal DCS is a set command to the ability informed by the digital identification signal DIS. Thus, the station which transmitted the digital command signal DCS is operated as a receiver thereafter. Further, the station which received the digital command signal DCS is operated as a transmitter hereinafter. Therefore, explanation will be made in the following on the assumption that the calling station is used as a transmitter and the called station is as a receiver. In this connection, in some applications, the transmitter may transmit a nonstandard function set signal NSS or a transmission terminal (station) identification signal TSI.

The calling station transmits the digital command signal DCS and thereafter transmits a training check signal TCF.

The CCITT recommendation prescribes that, when a modulation system is changed, a delay of 75±20 ms should be provided. In the above case, when the calling station transmits the training check signal TCF, this requires the modulation system to be changed. For this reason, the delay of 75±20 ms is required between the transmission of the digital command signal DCS and the transmission of the training check signal TCF.

The training check TCF is carried out with consecutive "0" of a time interval of 1.5 sec.±10% and with the same transmission rate as a message procedure to be later transmitted.

For the training check TCF and message procedure, a modulation system (2400, 4800, 7200, 9600 bps, etc.) prescribed by the CCITT recommendation V27ter, V29, etc. is used. Further, for procedures other than the training check signal TCF and message procedure, a modulation system (300 bps) is employed.

The receiver receives the digital command signal DCS and according to modulation system information contained in the digital command signal DCS, makes preparation for reception of the training check signal TCF, and then receives the training check signal TCF. When detecting an error in the training check signal TCF, the receiver transmits a training failure signal FTT.

The transmitter, when receiving the training failure signal FTT, performs operation necessary to change the modulation system (lower the data transmission rate), and again transmits the digital command signal DCS and training check signal TCF.

The receiver, when normally receiving the training check signal TCF, transmits a reception-ready confirmation signal CFR.

The transmitter, when receiving the reception-ready confirmation signal CFR, transmits a series of facsimile documents according to the message procedure. In this case, the transmitter attaches a control return signal RTC (RTC code) indicative of a shift to a pre-message procedure to the last part of the series of facsimile documents and thereafter transmits an end-of-procedure command EOP indicative of the pre-message procedure.

The receiver receives a message procedure and when detecting the RCT code therein, changes the reception modulation system to receive the pre-message procedure.

When the provision, i.e., modulation system of the aforementioned CCITT recommendation is changed, placement of the delay of 75±20 ms applies also to a time interval after the transmission of the RTC code until the transmission of the end-of-procedure command EOP as the pre-message procedure.

The receiver normally receives the facsimile documents, and when further receiving the end-of-procedure command EOP, transmits a message confirmation signal MCF.

The transmitter, when receiving the message confirmation signal MCF, transmits a disconnection command signal DCN to thereby cut off the line and terminate the procedure.

Explanation will next be made as to the case where the error correction system is employed. In this case, information based on the message procedure has an HDLC frame structure wherein the information is divided into frames of each 256 or 64 bytes and 256 frames are transmitted as one block. One block is also called one partial page herein. When one frame is made up of 256 bytes, one partial page is made up of 64 kbytes. When the number of bytes of one page of the facsimile documents exceeds 64 kbytes, one page of the facsimile documents is divided into partial pages for its transmission.

Part (b) of FIG. 10 shows only the extracted message procedure when the error correction system is employed. Even when the error correction system is employed, procedures other than the message procedure are the same as those when the error correction system is not employed as shown in Part (a) of Fig.

When the error correction system is employed, the transmitter transmits partial pages in accordance with the message procedure and thereafter transmits a partial page command PPS NULL.

The receiver, after receiving the partial page command PPS NULL, informs the transmitter of an erroneous frame in the facsimile documents received according to the message procedure by transmitting a partial page response PPR to the transmitter.

The transmitter, when receiving the partial page response PPR, again transmits the right frame corresponding to the erroneous frame and then the partial page command PPS NULL.

The receiver, when the error is corrected by the re-transmission, transmits the message confirmation signal MCF.

The transmitter performs the transmission of the next message procedure and when a facsimile document to be thereafter transmitted is absent, the transmitter transmits a partial page procedure end command PPS EOP.

When there is an error in the facsimile document received according to the message procedure, the transmitter again transmits the message in the same manner as the above procedure.

The receiver, when the error is corrected by the re-transmission, transmits the message confirmation signal MCF.

In other words, in the case where data transmission is carried out based on the error correction system, when a response from the communication party is available on the transmission line, the receiver detects the generation or non-generation of an error in the transmission data and, when detecting an error, the receiver requests the transmitter side to again transmit the data. The transmitter side again transmits the data according to the request. When such data transmission is carried out, even generation of an error on the transmission line enables transmission of right data.

Meanwhile, when an error takes place on the transmission line as mentioned above, the reception of the right data at the receiver side is delayed due to the re-transmission.

There has recently been proposed such an arrangement that a data transmission device is connected to a general switching telephone network, a facsimile terminal is connected to the data transmission device through a predetermined transmission line such as, e.g., a radio transmission line, so that the facsimile terminal performs its facsimile document transmission with a party facsimile apparatus of group 3 procedure connected to the general switching telephone network through the data transmission device.

With such an arrangement, however, when the facsimile terminal is arranged to perform all procedure control, generation of a data delay on the transmission line may, in some cases, cause the facsimile terminal not to be able to meet the time requirement prescribed by the CCITT recommendation. In this case, the command re-transmission is required and the data transmission rate is reduced, which disadvantageously results in that the communication time is prolonged.

To avoid this, the present embodiment is arranged to be able to satisfy the time requirement prescribed by the CCITT recommendation regardless of a data delay on the transmission line between the data transmission device and the terminal.

A facsimile communication system of the present embodiment will be detailed by referring to the accompanying drawings.

Turning to FIG. 11, there is shown a general arrangement of a facsimile communication system using the data communication system of the present embodiment. The illustrated facsimile communication system comprises a G3 facsimile apparatus 210 and a facsimile communication system 200 of the present embodiment connected to a general switching telephone network 220. The general switching telephone network 220 includes a data transmission device 230 connected to the general switching telephone network 220 through a telephone line 250 and a facsimile terminal 240 connected to the data transmission device 230 through the transmission line 260. In this connection, the transmission line 260 connected between the data transmission device 230 and terminal 240 may be, for example, a radio transmission line or a wired transmission line.

Shown in FIG. 12 is a detailed structure of the data transmission device 230 in FIG. 11.

In FIG. 12, the data transmission device 230 includes a network controller 301 for performing control of connection with the general switching telephone network 220 through the telephone line 250, a transmission line controller 302 for performing control of connection with the terminal 240 via the transmission line 260, a call connector 303 for connection to a terminal specified by a caller side, a transmission rate determiner/notifier 307 for setting a transmission rate with the network and giving a notification thereto, a message transmitter 308 for transmitting a message at the time of receiving a transmission request from the terminal 240 via the transmission line 260, a message receiver 309 for receiving a message from the terminal 240 through the transmission line 260 at the time of receiving a reception request from a party terminal, i.e., the G3 facsimile apparatus 210 through the general switching telephone network 220, a memory 305 to be used as a temporary memory during message communication, a G3 error controller 310 for handling a data error on the general switching telephone network 220, a transmission line error controller 311 for a data error on the transmission line 260, a RTC detector 306 for detecting a RTC code during message reception, and a main controller 304 for performing general control over the respective parts or elements of the system. These constituent elements are mutually connected through a bus line 312.

Next, the operation of the present embodiment will be explained by referring to flowcharts of FIGS. 13 to 19.

FIG. 13 is a flowchart for explaining the entire communication operation of the data transmission device 230 of FIG. 12.

In FIG. 13, the data transmission device 230 first judges whether to be used as a receiver side or a transmitter side (step 401). The judging operation of the step 401 is carried out under the main controller 304 on the basis of information received at the network controller 301 from the general switching telephone network 220 via the telephone line 250 or on the basis of information received at the transmission line controller 302 from the terminal 240 through the transmission line 260. That is, when the network controller 301 receives the calling tone CNG from the party G3 facsimile apparatus 210 through the telephone line 250, the data transmission device 230 determines to be used as a receiver side; whereas, when the transmission line controller 302 receives a calling signal from the terminal through the transmission line 260, the data transmission device 230 determines to be used as a transmitter side.

Explanation will be made first as to the case where the data transmission device 230 is determined to be used as the receiver side in the step 401.

When determining in the step 401 that the data transmission device 230 is used as the receiver side, the data transmission device 230, in response to a request of transmission of the digital identification signal DIS received from the terminal 240 via the transmission line 260, transmits the digital identification signal DIS to the general switching telephone network 220 via the telephone line 250 (step 402) and enters into the pre-message procedure (step 403).

Then, the data transmission device 230 performs its transmission-rate determining/notifying operation to determine the transmission rate of a message to be received by performing its transmission-rate training with the general switching telephone network 220 and to inform the terminal 240 of the determined transmission rate (step 404).

Subsequently, the data transmission device 230 performs its message receiving operation to transmit image data received from the party G3 facsimile apparatus 210 to the terminal 240 (step 405), and thereafter performs its cut-off operation to disconnect the line with the party G3 facsimile apparatus 210 therefrom (step 406), thus terminating the communication.

The transmission-rate determining/notifying operation of the step 404 and the message receiving operation of the step 405 are carried out respectively in the transmission rate determiner/notifier 307 and the message receiver 309 in FIG. 12. The transmission-rate determining/notifying operation and the message receiving operation will be later explained in detail respectively by referring to the flowchart of FIG. 14 and the flowchart of FIGS. 16 and 18.

Explanation will next be made in connection with the case where the data transmission device 230 is used as a transmitter side.

When determining in the step 401 that the data transmission device 230 is used as a transmitter side, the data transmission device 230 receives the digital identification signal DIS from the party G3 facsimile apparatus 210 (step 407) and transmits to a confirmation signal for confirmation of the reception digital identification signal DIS (step 408).

The data transmission device 230 then performs the transmission-rate determining/notifying operation to determine the transmission rate of a message to be transmitted by performing transmission-rate training with the general switching telephone network 220 and to inform the determined transmission rate to the terminal 240 (step 409).

Subsequently, the data transmission device 230 performs its message transmitting operation to transmit image data received from the terminal to the party G3 facsimile apparatus 210 (step 410), and thereafter performs its cut-off operation to disconnect the line with the party G3 facsimile apparatus 210 therefrom (step 411), thus terminating the communication.

The transmission-rate determining/notifying operation of the step 409 and the message transmitting operation of the step 410 are carried out respectively in the transmission rate determiner/notifier 307 and the message transmitter 308. The transmission-rate determining/notifying operation and the message transmitting operation will be later explained in detail respectively by referring to the flowchart of FIG. 17 and the flowchart of FIG. 19.

FIG. 14 shows details of the transmission-rate determining/notifying operation of the step 404 in FIG. 13, and in this case, shows the operation of the transmission rate determiner/notifier 307 when the data transmission device 230 is used as a receiver side.

The transmission rate determiner/notifier 307, when receiving the digital command signal DCS from the general switching telephone network 220, first performs its reception preparing operation with a transmission rate specified in the received digital command signal DCS and performs training reception (step 421). Further, in order to advance the procedure to the terminal 240, the transmission rate determiner/notifier 307 transmits a signal for confirmation of the reception of the digital command signal DCS onto the transmission line 260 (step 422) to begin negotiation on terminal matching except for the transmission rate, and as its result, receives from the terminal 240 a signal of demanding transmission of the reception-ready confirmation signal CFR (step 423). If the reception result of the training is good (step 423), the transmission rate determiner/notifier 307 transmits the reception-ready confirmation signal CFR to the general switching telephone network 220 to inform the terminal of the completion of the transmission rate and terminal matching (step 424) and terminates the current processing. However, when the reception result is not good, the transmission rate determiner/notifier 307 transmits the training failure signal FTT to the general switching telephone network 220 to request the re-training (step 426) and returns to the step 421.

FIG. 15 shows details of the transmission-rate determining/notifying operation of the step 409, and in this case, shows the operation of the transmission rate determiner/notifier 307 when the data transmission device 230 is used as a transmitter side.

In this case, when the transmission rate determiner/notifier 307 receives a request of transmitting the digital command signal DCS from the transmission line 260 (step 431), the transmission rate determiner/notifier 307 transmits the digital command signal DCS and training to the network to inspect the quality of the general switching telephone network 220 (steps 432 and 433). And the transmission rate determiner/notifier 307 enters into a training-result wait mode. When receiving the signal FTT from the general switching telephone network 220 (step 434), the transmission rate determiner/notifier 307 judges it as a bad result and change the transmission rate to a lower transmission rate (step 436), returns to the step 432, and again transmits the digital command signal DCS.

When receiving in the step 434 the reception-ready confirmation signal CFR, the transmission rate determiner/notifier 307 judges it as a good result, transmits a signal for confirmation of the reception of the reception-ready confirmation signal CFR to the transmission line 260, and informs the terminal of the determined transmission rate (step 435).

In this way, the transmission rate determination is carried out with respect to the network to take a procedure of informing the terminal 240 of the determined transmission rate. As a result, the terminal 240 can obtain a filler amount at the time of transmitting image data. The filler amount is used to perform control during the transmission of the image data.

FIG. 16 shows an example of the message receiving operation of the step 405 in FIG. 13 when a technique without the error correction is employed.

In FIG. 16, the data transmission device 230 is first put in a message procedure mode (step 441) and receives image data from the party G3 facsimile apparatus 210 through the general switching telephone network 220 (step 442). And the data transmission device 230 transmits the image data to the terminal 240 through the transmission line 260 (step 445) until the device 230 detects a RTC code indicative of the last page during the data reception (step 443).

When determining in the step 443 the detection of the RTC code, the data transmission device 230 shifts the current mode to a post message procedure mode (step 444). The detection of the RTC code is effected by the RTC detector 306 in FIG. 12.

FIG. 17 shows an example of the message transmitting operation of the step 410 in FIG. 13 when a technique without the error correction is employed as in FIG. 16.

In this case, the data transmission device 230 accepts image data received from the terminal 240 via the transmission line 260 (step 451), and transmits it to the party terminal, i.e., to the party G3 facsimile apparatus 210 via the general switching telephone network 220 (step 452).

FIG. 18 shows another example of the message receiving operation of the step 405 in FIG. 13, and FIG. 19 shows another example of the message transmitting operation of the step 410 in FIG. 13. In FIGS. 18 and 19, a technique with the error correction is employed. In this conjunction, the error correction is effected by the G3 error controller 310 and transmission line error controller 311 in FIG. 12.

In FIG. 18, the data transmission device 230 is first put in a message procedure mode (step 461) to receive an image data frame from the party terminal, i.e., from the party G3 facsimile apparatus 210 (step 462). When detecting a RCP code indicative of the last of the data (step 463), the data transmission device 230 is put in a post message procedure mode (step 464). And when receiving a partial page procedure end command PPS (step 465), the data transmission device 230 performs its error detecting operation over the data received from the general switching telephone network 220 (step 466). The error detection is carried out by the G3 error controller 310 in FIG. 12.

When determining in the step 466 the presence of an error, the data transmission device 230 attaches the erroneous frame number to the partial page response PPR, transmits the partial page response PPR indicative of the erroneous frame number to the general switching telephone network 220, and returns to the step 461.

When determining in the step 466 the absence of a transmission error, the data transmission device 230 transmits a message confirmation signal MCF to the general switching telephone network 220 (step 467).

Next, the data transmission device 230 transmits the image data to the terminal 240 via the transmission line 260 (step 468). In the absence of a re-transmission request (step 469), the data transmission device 230 terminates the current processing as it is. When determining in the step 469 the presence of a re-transmission request, the data transmission device 230 again transmits the request frame (step 471) and returns to the step 468.

In FIG. 19, the data transmission device 230 first accepts image data from the terminal 240 via the transmission line 260 (step 481) and performs its error detecting operation over the accepted image data (step 482). The error detection is effected by the transmission line error controller 311 in FIG. 12.

In this conjunction, for the error detecting method by the transmission line error controller 311, the technique explained in connection with FIGS. 1 to 9 can be employed.

When determining in the step 482 the absence of an error, the data transmission device 230 goes to the step 483. When determining in the same step the presence of an error, the data transmission device 230 judges whether or not the error correction is executable (step 486). If executable, then the data transmission device 230 corrects the erroneous frame (step 488) and shifts to the step 483. If the correction is not executable, then the data transmission device 230 requests the frame re-transmission to the transmission line (step 487) and returns to the step 481.

The data transmission device 230 transmits in the step 483 the image data to the party terminal, i.e., to the party G3 facsimile apparatus 210 and then transmits a partial page procedure end command PPSA indicative of the end of all the partial pages or pages (step 484). And the data transmission device 230 waits for a message reception result from the general switching telephone network 220 (step 485). When receiving a partial page response PPR indicative of a bad message reception, the data transmission device 230 again transmits the frame having the erroneous frame number indicated in the received response PPR to the data transmission device 230 (step 489) and returns to the step 183. When receiving in the step 485 a message confirmation signal MCF indicative of a good message reception, the data transmission device 230 terminates the current processing.

What is claimed is:

1. A data communication system for transmitting/receiving digital information via a duplex communication line comprising:

block division means for dividing information to be transmitted into information blocks each having a suitable length;

framing means for converting the information blocks divided by said block division means into frames and for transmitting said frames; and line quality judgement means for judging on the basis of a bit error state of said communication line whether a line quality is good or bad, wherein said framing means further includes:

error detection code generation/application means for generating an error detection code for each of the information blocks to be transmitted and for attaching said error detection code to the associated information block;

error correction code generation/application means for generating an error correction code for the information block having said error detection code attached by said error detection code generation/application means and for attaching said error correction code to the associated information block; and zero insertion means for inserting a time fill signal in the absence of transmission of the frame and for inserting a suitable number of zero bits in the information block having the error correction code attached by said error correction code generation/application means to provide a distinguished boundary between said time fill signal and said frame, and wherein said block division means includes means, when said line quality judgement means judges that the line quality is good, for dividing the information into information blocks having a length exceeding an error correctable upper limit code length based on said error correction code.

2. A data communication system as set forth in claim 1, wherein said block division means includes means for making a predetermined frame length at the time of a predetermined line quality longer than said predetermined frame length through further detailed line quality judgement of said line quality judgement means in a range exceeding said error correctable upper limit code length or in a range below the error correctable upper limit code length.

3. A data communication system as set forth in claim 1, further comprising error correction means for receiving the information having said error correction code attached thereto from a party side, separating said error correction code from the received information, decoding the error correction code to detect an error generated in the information, and correcting the error, and wherein said line quality judgement means includes means for judging whether the line quality is good or bad based on the error detected by said error correction means.

4. A data communication system as set forth in claim 1, further comprising error correction means for receiving the information having said error correction code and said error detection code attached thereto from a party side, separating said error correction code from the received information, decoding the error correction code to detect an error generated in the information, and correcting the error and error detection means for separating said error detection code from the information corrected by said error correction means, decoding said error detection code to further detect an error not corrected by said error correction means, and wherein said line quality judgement means includes means for judging whether the line quality is good or bad on the basis of the error detected by at least one of said error correction means and said error detection means.

5. A data communication system as set forth in claim 1, further comprising time fill error detection means for receiving a time fill signal from a party side and detecting an error generated in said time fill signal, and wherein said line quality judgement means includes means for judging whether the line quality is good or bad on the basis of said error detected by said time fill error detection means.

6. A data communication system as set forth in claim 1, further comprising re-transmission request response frame transmission means for transmitting a re-transmission request response frame in response to a re-transmission request received from a party side and a re-transmission request response frame reception means for receiving said re-transmission request response frame from said party side, and wherein said line quality judgement means includes means for judging whether the line quality is good or bad on the basis of an information error that caused said re-transmission request response frame received by said re-transmission request response frame reception means.

7. A data communication system as set forth in claim 1, further comprising line quality information transmission means for transmitting judged line quality information indicative of the good or bad line quality judged by said line quality judgement means to a party side as a line quality information frame and line quality information reception means for receiving said line quality information frame from said party side, and wherein said line quality judgement means includes means for judging whether the line quality is good or bad on the basis of the line quality information frame received by said line quality information reception means.

8. A data communication system as set forth in claim 1, further comprising error correction means for receiving the information having said error correction code attached thereto from a party side, separating said error correction code from said information, decoding the error correction code to detect an error generated in the information, and correcting said error and a frame length counter for counting a frame length of the information having the error correction code attached thereto received from said party side, and wherein said error correction means includes means operated only when a counted value of said frame length counter is below said error correctable upper limit code length.

9. A data communication system as set forth in claim 1, further comprising information frame transmission means for transmitting a next information frame prior to a response to the previously-transmitted information frame received from a party side, response inducement frame transmission means for transmitting a response inducement frame to induce said party side to send a response to the information frame transmitted by said information frame transmission means, and response frame prediction means for predicting on the basis of the received response frame that the response frame is erroneous, and wherein said response inducement frame transmission means includes means for transmitting said response inducement frame in response to prediction by said response frame prediction means.

10. A data communication system comprising:
data transmission means connected to a public switching telephone network; and
facsimile communication means connected to said data transmission means through a predetermined transmission line for transmitting a facsimile document to a group 3 party facsimile terminal connected to said public switching telephone network through said predetermined transmission line and said data transmission means,
said data transmission means including:
transmission rate determination means, prior to transmission of said facsimile document from said facsimile terminal, for transmitting a training check signal to said party facsimile terminal on said public switching telephone network and when receiving a response to said training check signal from said party facsimile terminal, for determining a transmission rate of said facsimile document;
notification means for informing said facsimile communication means of said transmission rate determined by said transmission rate determination means; and
error correction control means including first error correction control means for performing error correction control of said party facsimile terminal through data transmission with said party facsimile terminal, second error correction control means for performing error correction control through data transmission with said facsimile communication means, block division means for dividing information to be transmitted into information blocks having a suitable length, and framing means for converting the information blocks divided by said block division means into frames, said framing means includes error detection code generation/application means for generating an error detection code for each of the information blocks divided by said block division means and attaching said error detection code to the associated information block, error correction code generation/application means for generating an error correction code for the information block having said error detection code attached thereto by said error detection code generation/application means and attaching said error correction code to the associated information block, and zero insertion means for inserting a time fill signal in the absence of frame transmission and inserting a suitable number of zero bits in the information having the error correction code attached thereto by said error correction code generation/application means to provide a distinguished boundary between said time fill signal and a frame.

11. A data communication system as set forth in claim 10, wherein said data transmission means includes code detection means for detecting a code signal indicative of return to a post message procedure to said party facsimile terminal from a message procedure causing the facsimile document from said party facsimile terminal to be transmitted to said facsimile communication means, and post message procedure means for shifting to said post message procedure when said code detection means detects said code signal.

12. A data communication system comprising:
data transmission means connected to a public switching telephone network; and
facsimile communication means connected to said data transmission means through a predetermined transmission line for transmitting a facsimile document to a group 3 party facsimile terminal connected to said public switching telephone network through said predetermined transmission line and said data transmission means, said data transmission means including:

transmission rate determination means, prior to transmission of said facsimile document from said facsimile terminal, for transmitting a training check signal to said party facsimile terminal on said public switching telephone network and when receiving a response to said training check signal from said party facsimile terminal, for determining a transmission rate of said facsimile document;

notification means for informing said facsimile communication means of said transmission rate determined by said transmission rate determination means; and error correction control means including first error correction control means for performing error correction control of said party facsimile terminal through data transmission with said party facsimile terminal, and second error correction control means for performing error correction control through data transmission with said facsimile communication means, said second error correction control means includes block division means for dividing information to be transmitted into information blocks having a suitable length, framing means for converting the information blocks divided by said block division means into frames and transmitting said frames, and line quality judgement means for judging whether the line quality is good or bad on the basis of a bit error state of a communication line, and wherein said block division means includes means for changing a length of information to be divided according to the good or bad line quality judged by said line quality judgement means.

13. A data communication system comprising:

data transmission means connected to a public switching telephone network; and facsimile communication means connected to said data transmission means through a predetermined transmission line for transmitting a facsimile document to a group 3 party facsimile terminal connected to said public switching telephone network through said predetermined transmission line and said data transmission means, said data transmission means including:

transmission rate determination means, prior to transmission of said facsimile document from said facsimile terminal, for transmitting a training check signal to said party facsimile terminal on said public switching telephone network and when receiving a response to said training check signal from said party facsimile terminal, for determining a transmission rate of said facsimile document;

notification means for informing said facsimile communication means of said transmission rate determined by said transmission rate determination means; and error correction control means including first error correction control means for performing error correction control of said party facsimile terminal through data transmission with said party facsimile terminal, and second error correction control means for performing error correction control through data transmission with said facsimile communication means, said second error correction control means includes block division means for dividing information to be transmitted into information blocks having a suitable length, framing means for converting the information blocks divided by said block division means into frames and transmitting said frames, and line quality judgement means for judging whether the line quality is good or bad on the basis of a bit error state of a communication line, wherein said framing means includes error detection code generation/application means for generating an error detection code for information to be transmitted and attaching said error detection code to the information, error correction code generation/application means for generating an error correction code for the information having said error detection code attached thereto by said error detection code generation/application means and attaching said error correction code to the information, and zero insertion means for inserting a time fill signal in the absence of frame transmission and inserting a suitable number of zero bits in the information having the error correction code attached thereto by said error correction code generation/application means to provide a distinguished boundary between said time fill signal and a frame, and wherein said block division means includes means, when said line quality judgement means judges that the line quality is good, for dividing the information into information blocks having a length exceeding an error correctable upper limit code length based on said error correction code.

14. A data communication system as set forth in claim 13, wherein said block division means includes means for making a predetermined frame length at the time of a predetermined line quality longer than said predetermined frame length through further detailed line quality judgement of said line quality judgement means in a range exceeding said error correctable upper limit code length or in a range below the error correctable upper limit code length.

15. A data communication system as set forth in claim 13, further comprising error correction means for receiving the information having said error correction code attached thereto from a party side, separating said error correction code from the received information, decoding the error correction code to detect an error generated in the information, and correcting the error, and wherein said line quality judgement means includes means for judging whether the line quality is good or bad based on the error detected by said error correction means.

16. A data communication system as set forth in claim 13, further comprising error correction means for receiving the information having said error correction code and said error detection code attached thereto from a party side, separating said error correction code from the received information, decoding the error correction code to detect an error generated in the information, and correcting the error and error detection means for separating said error detection code from the information corrected by said error correction means, decoding said error detection code to further detect an error not corrected by said error correction means, and wherein said line quality judgement means includes means for judging whether the line quality is good or bad on the basis of the error detected by at least one of said error correction means and said error detection means.

17. A data communication system as set forth in claim 13, further comprising time fill error detection means for receiving a time fill signal from a party side and detecting an error generated in said time fill signal, and wherein said line quality judgement means includes means for judging whether the line quality is good or bad on the basis of said error detected by said time fill error detection means.

18. A data communication system as set forth in claim 13, further comprising re-transmission request response frame transmission means for transmitting a re-transmission request response frame in response to a re-transmission request received from a party side and a re-transmission request response frame reception means for receiving said re-transmission request response frame from said party side, and wherein said line quality judgement means includes means for judging whether the line quality is good or bad on the basis of an information error that caused said re-transmission request response frame received by said re-transmission request response frame reception means.

19. A data communication system as set forth in claim 13, further comprising line quality information transmission means for transmitting judged line quality information indicative of the good or bad line quality judged by said line quality judgement means to a party side as a line quality information frame and line quality information reception means for receiving said line quality information frame from said party side, and wherein said line quality judgement means includes means for judging whether the line quality is good or bad on the basis of the line quality information frame received by said line quality information reception means.

20. A data communication system as set forth in claim 13, further comprising error correction means for receiving the information having said error correction code attached thereto from a party side, separating said error correction code from said information, decoding the error correction code to detect an error generated in the information, and correcting said error and a frame length counter for counting a frame length of the information having the error correction code attached thereto received from said party side, and wherein said error correction means includes means operated only when a counted value of said frame length counter is below said error correctable upper limit code length.

21. A data communication system as set forth in claim 13, further comprising information frame transmission means for transmitting a next information frame prior to a response to the previously-transmitted information frame received from a party side, response inducement frame transmission means for transmitting a response inducement frame to induce said party side to send a response to the information frame transmitted by said information frame transmission means, and response frame prediction means for predicting on the basis of the received response frame that the response frame is erroneous, and wherein said response inducement frame transmission means includes means for transmitting said response inducement frame in response to prediction by said response frame prediction means.

* * * * *

UNITED STATES PATENT AND TRADEMARK OFFICE
CERTIFICATE OF CORRECTION

PATENT NO. : 5,638,384
DATED : June 10, 1997
INVENTOR(S) : Katsuhiko HAYASHI et al.

It is certified that error appears in the above-indentified patent and that said Letters Patent is hereby corrected as shown below:

Title page, item [57], line 13 of Abstract, "the" should read --be--.

Signed and Sealed this

Fifth Day of May, 1998

Attest:

BRUCE LEHMAN

*Attesting Officer*           *Commissioner of Patents and Trademarks*